(12) United States Patent
Laska et al.

(10) Patent No.: US 12,050,589 B2
(45) Date of Patent: Jul. 30, 2024

(54) SYSTEMS AND METHODS FOR UPDATING MAPS AND EVALUATING MAP ACCURACY BASED ON COLLECTED IMAGE DATA

(71) Applicant: Lyft, Inc., San Francisco, CA (US)

(72) Inventors: Jason Noah Laska, San Francisco, CA (US); Han Suk Kim, San Francisco, CA (US); Matthew Jonathan Feldman, San Francisco, CA (US); Artur Dryomov, Minsk (BY); Lev Dragunov, Minsk (BY); Yakau Bubnou, Minsk (BY); Yanina Michukova, Minsk (BY); Oleg Shnitko, Minsk (BY); Stanislau Binko, Minsk (BY); Siddharth Vijayakrishnan, Kirkland, WA (US); Mark Edward Huberty, San Francisco, CA (US); Kathryn Flaherty Frisbie, San Francisco, CA (US); Mikhail Viktorovich Chuikin, Minsk (BY); Dzmitry Kavaliou, Minsk (BY)

(73) Assignee: Lyft, Inc., San Francisco, CA (US)

( * ) Notice: Subject to any disclaimer, the term of this patent is extended or adjusted under 35 U.S.C. 154(b) by 176 days.

(21) Appl. No.: 17/564,686

(22) Filed: Dec. 29, 2021

(65) Prior Publication Data
US 2023/0205753 A1    Jun. 29, 2023

(51) Int. Cl.
*G06F 16/23* (2019.01)
*G01C 21/00* (2006.01)
(Continued)

(52) U.S. Cl.
CPC ..... *G06F 16/2365* (2019.01); *G01C 21/3837* (2020.08); *G06F 16/29* (2019.01);
(Continued)

(58) Field of Classification Search
CPC . G06F 16/2365; G06F 16/29; G01C 21/3837; G01C 21/3811; G06V 20/54;
(Continued)

(56) References Cited

U.S. PATENT DOCUMENTS

2019/0019330 A1*  1/2019  Miyaoka ............ G01C 21/3841
2019/0147331 A1   5/2019  Arditi
(Continued)

FOREIGN PATENT DOCUMENTS

| KR | 101475038 B1 | 12/2014 | |
|---|---|---|---|
| KR | 20190082071 A | 7/2019 | |
| WO | WO-2015099387 A1 * | 7/2015 | ........... G08G 1/0104 |

OTHER PUBLICATIONS

International Searching Authority, International Search Report and Written Opinion, PCT/US2022/044148, mailed Jan. 10, 2023, 10 pages.

*Primary Examiner* — Timothy J Henn
(74) *Attorney, Agent, or Firm* — Lee Sullivan Shea & Smith LLP

(57) ABSTRACT

Examples disclosed herein involve a computing system configured to (i) receive, from an image-capture device, image-capture metadata that provides information about a set of images that were passively captured by the image-capture device, (ii) based at least on the received image-capture metadata, apply a collection policy for determining whether to collect any of the set of images that have been passively captured by the image-capture device and thereby determine that a selected subset of one or more images in the set of images are to be collected from the image-capture device, (iii) instruct the image-capture device to upload the selected subset of one or more images, and (iv) after instructing the image-capture device to upload the selected (Continued)

subset of one or more images, receive the selected subset of one or more images from the image-capture device.

21 Claims, 11 Drawing Sheets

(51) Int. Cl.
  *G06F 16/29* (2019.01)
  *G06V 20/54* (2022.01)
  *H04N 7/18* (2006.01)
(52) U.S. Cl.
  CPC .............. *G06V 20/54* (2022.01); *H04N 7/183* (2013.01); *G06V 2201/10* (2022.01)
(58) Field of Classification Search
  CPC .... G06V 2201/10; G06V 10/62; G06V 10/95; G06V 20/56; H04N 7/183; H04N 7/181
  See application file for complete search history.

(56) References Cited

U.S. PATENT DOCUMENTS

| | | | |
|---|---|---|---|
| 2019/0278297 A1* | 9/2019 | Averhart | G01C 21/3658 |
| 2019/0317239 A1 | 10/2019 | Olsson et al. | |
| 2020/0234459 A1* | 7/2020 | Naikal | G06T 7/74 |
| 2021/0396537 A1* | 12/2021 | Lee | G01C 21/3602 |
| 2022/0141426 A1* | 5/2022 | Kim | G06V 20/56 |
| | | | 348/148 |

* cited by examiner

SYSTEMS AND METHODS FOR UPDATING MAPS AND EVALUATING MAP ACCURACY BASED ON COLLECTED IMAGE DATA

BACKGROUND

In various areas of technology, pre-encoded information about the world (which may sometimes be referred to as a map or map data) may be utilized to perform various operations. As one possible example, transportation-matching platforms such as rideshare platforms may use pre-encoded information about the world to perform operations such as matching individuals with available vehicles, generating routes for vehicles to follow when picking up and/or transporting individuals, providing estimates of pickup and drop-off times, choosing locations for performing pickups and/or drop-offs, pre-positioning vehicles within the given area in anticipation of responding to transportation requests, and/or providing visualizations to ends users such as riders or drivers, among other possibilities. It should be understood that pre-encoded information about the world (or perhaps other geographically-associated information) may be used in various other areas of technology as well.

SUMMARY

In one aspect, the disclosed technology may take the form of a method that involves (i) receiving, from an image-capture device, image-capture metadata that provides information about a set of images that were passively captured by the image-capture device, (ii) based at least on the received image-capture metadata, applying a collection policy for determining whether to collect any of the set of images that have been passively captured by the image-capture device and thereby determining that a selected subset of one or more images in the set of images are to be collected from the image-capture device, (iii) instructing the image-capture device to upload the selected subset of one or more images, and (iv) after instructing the image-capture device to upload the selected subset of one or more images, receiving the selected subset of one or more images from the image-capture device.

In some example embodiments, the method may further involve prior to applying the collection policy: (i) receiving, from the image-capture device, location data that is indicative of a time sequence of locations of the image-capture device during a period of time when the set of images were passively captured by the image-capture device, and (ii) based on the received location data, determining a set of capture locations associated with the set of images, wherein the determined set of capture locations is used as a further basis for applying the collection policy.

Further, in some example embodiments, determining the set of capture locations associated with the set of images may involve (i) based on the received location data, determining a time sequence of device locations for the image-capture during the period of time when the set of images were passively captured by the image-capture device, and (ii) using the determined time sequence of device locations and the image-capture metadata to determine the set of capture locations associated with the set of images.

Further yet, in some example embodiments, each image in the set of images may correspond to a road segment in a road network, and applying the collection policy may involve determining whether each respective image in the set of images is to be collected from the image-capture device based on an evaluation of at least one factor selected from a group of factors consisting of: (i) whether there is an absence of previously-collected images for the respective image's corresponding road segment, (ii) whether previously-collected images for the respective image's corresponding road segment lack a threshold level of freshness, (iii) whether there is a difference between objects detected in the respective image and objects detected in previously-collected images for the respective image's corresponding road segment, (iv) whether a request to affirmatively collect fresh image data for the respective image's corresponding road segment has been received, and (v) whether the respective image's corresponding road segment has a threshold level of importance.

Still further, in some example embodiments, determining whether each respective image in the set of images is to be collected from the image-capture device based on the evaluation of the at least one factor may involve, for each respective image in the set of images: accessing stored information about the previously-collected images for the respective image's corresponding road segment.

Still further, in some example embodiments, determining whether each respective image in the set of images is to be collected from the image-capture device based on the evaluation of the at least one factor may involve, for each respective image in the set of images: determining that the respective image is to be collected from the image-capture device if the at least one factor is satisfied for the respective image.

Still further, in some example embodiments, determining whether each respective image in the set of images is to be collected from the image-capture device based on the evaluation of the at least one factor may involve, for each respective image in the set of images: (i) for the at least one factor, determining a factor-specific value for the respective image, (ii) based on the determined factor-specific value, determining a composite value for the respective image, and (iii) determining whether the respective image is to be collected from the image-capture device based on a comparison between the respective image's composite value and a threshold value.

Still further, in some example embodiments, the threshold value may be dynamically updated based on upload activity of the image-capture device.

Still further, in some example embodiments, the method may further involve utilizing the selected subset of one or more images to facilitate a process for reviewing and updating a map.

Still further, in some example embodiments, the method may further involve utilizing the selected subset of one or more images to facilitate a process for reviewing and evaluating accuracy of a map.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1:
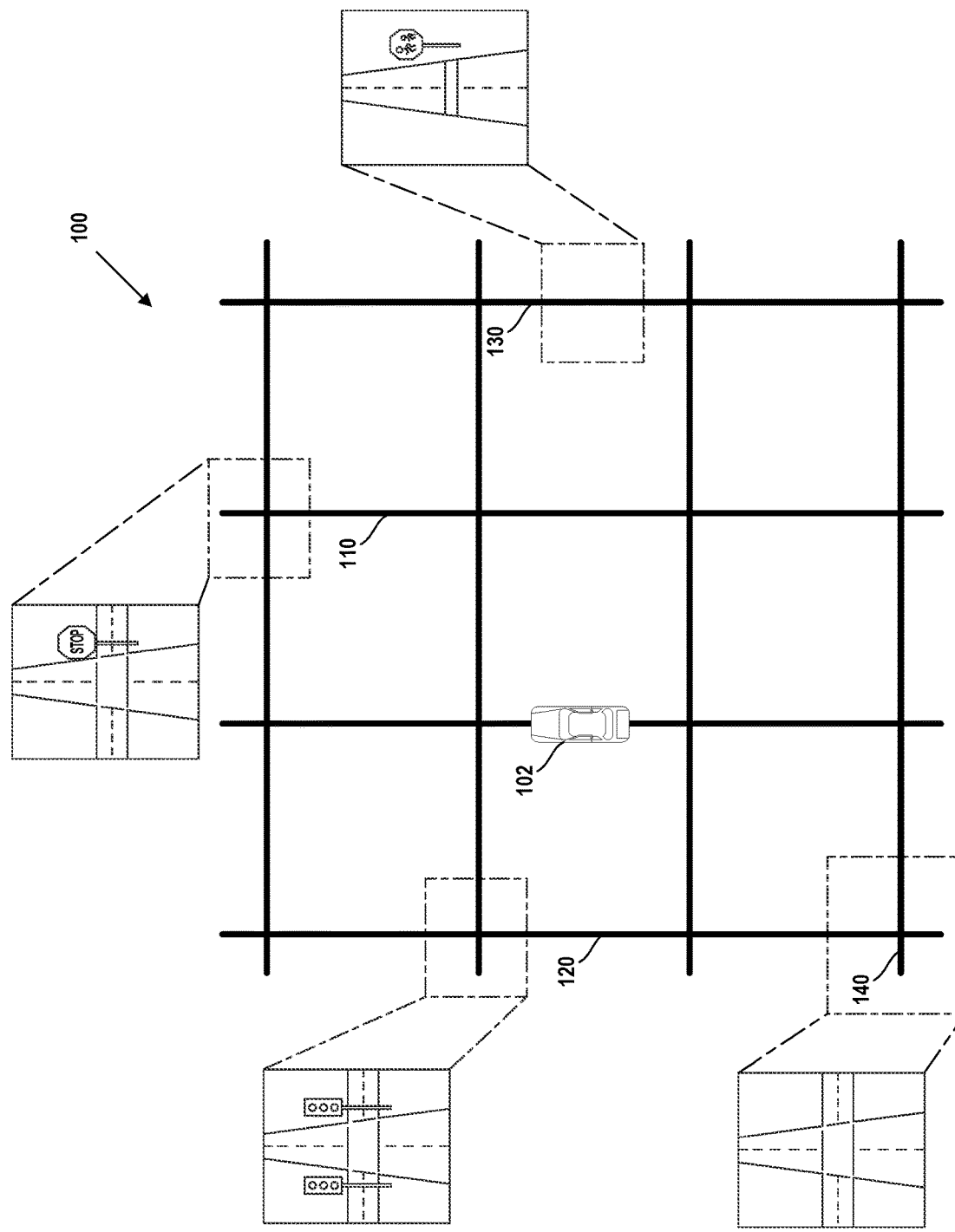
FIG. 1 is a diagram that illustrates a portion of a road network that is being traversed by a vehicle.

As noted above, pre-encoded information about the world—which may be referred to herein as a map or map data—plays an important role in various areas of technology. For example, transportation-matching platforms (e.g., ride-share platforms) may use maps to perform various different operations, including but not limited to matching individuals with available vehicles in a mapped area, generating possible routes for vehicles to follow when picking up and/or transporting individuals in a mapped area, providing estimates of pickup and drop-off times in a mapped area, pre-positioning vehicles in a mapped area in anticipation of responding to transportation requests, and/or providing visualizations of a mapped area to users such as riders or drivers, among other possibilities. As another example, navigation applications running on client devices may use maps to perform various different operations, including but not limited to determining possible routes from a source location to a destination location in a mapped area, providing estimates of the time it will take to travel from the source location to the destination location along a possible route, and/or providing visualizations of a mapped area to users of the client devices. Maps may be used in various other areas of technology as well.

Typically, these types of maps will include pre-encoded information about the road network that is located within the mapped area, which facilitates many of the operations described above. In this respect, a road network located a mapped area may be logically broken down into down into a set of interconnected "road segments," each of which represents a discrete portion of the road network, and the pre-encoded information about the road network may then comprise a respective set of pre-encoded information for each of the road segments, which may take any of various forms depending on the map, the type of road segment, etc. As one example, the respective set of pre-encoded information for a road segment may include certain defining information for that road segment, such as a road-segment identifier, geospatial information (e.g., coordinates) that indicates the road segment's location and geometry, and/or an indication of a type, category, or other classification of the road segment, among other possibilities. As another example, the respective set of pre-encoded information for a road segment may include information about certain types of road elements that may be found within or along the road segment—examples of which may include road signs (e.g., stop signs, crosswalk signs, speed limit signs, etc.), traffic lights, lanes, crosswalks, etc.—and the pre-encoded information about such a road element may include an indication of the type and location of the road element, among other possibilities. The pre-encoded information about a road network that is included as part of a map may take various other forms as well.

In order to generate a map that includes pre-encoded information about a road network, it is typically necessary to collect a large volume of image data for the area that is to be mapped and then process and analyze this image data (which may involve both automated techniques and human review) in order to determine the necessary information about each of the road segments within the road network. After such a map is generated, it may also be desirable to continue collecting image data for the mapped area on an ongoing basis so that such image data can be used to monitor whether the generated map is complete, accurate, and up-to-date and thereby determine whether any map updates are necessary. For instance, image data that is collected for a previously-mapped area could be used to detect map errors introduced by the map generation process as well as real-world changes in the mapped area that have caused the map to become out-of-date, such as the addition or removal of road element within or along a given road segment.

It should be understood that this use of image data for a road network to create and/or update a map is just one illustrative example of a technology area that utilizes image data for a road network, and that there may be various other areas of technology that may utilize image data for a road network as well. For these and other reasons, there is a need for technology that facilitates collection of image data for a road network.

In an attempt to address this need, some map providers (or the like) have begun using a "planned" approach for collecting image data for a road network under which a fleet of "collection vehicles" equipped image-capture devices are sent out to traverse different road segments within the road network for the specific purpose of actively capturing image data for those road segments. However, this kind of "planned" collection of image data for a road network presents a number of drawbacks.

As an initial matter, a map provider will typically only have access to a limited number of vehicles that are available to participate in this kind of "planned" collection of image data for a road network, because this requires vehicles that are traversing the road network for the specific purpose of actively capturing image data for certain road segments and cannot be engaging in any other, normal driving activities during those times. Given this limitation, it is difficult for a "planned" collection approach to collect image data for the full range of road segments included within the road network, let alone to collect image data for the full range of road segments in a timely manner, which may give rise to several undesirable consequences—including maps becoming out-of-date due to a lack of fresh image data.

Moreover, even if it were theoretically possible for a map provider to carry out a "planned" collection of image data for a road network using a fleet of vehicles that was large enough to timely capture the full range of road segments included within the road network, the cost associated with operating that fleet of vehicles (both in terms of the cost of the vehicles and the cost of employing drivers to drive the vehicles) would be substantial, which also renders this kind of "planned" approach for collecting image data for a road network undesirable for most entities attempting to collect image data.

One alternative approach that avoids these drawbacks with "planned" collection would be to configure image-capture devices within vehicles to (i) passively capture image data for a road network while the vehicles are traversing the road network for purposes other than planned image collection and then (ii) upload that passively-captured image data to a central computing platform that is tasked with collecting and compiling the image data for the road network. Advantageously, such an approach may provide a cost-effective way to expand the universe of vehicles that are available to participate in the collection and thereby enables image data to be timely captured for a much wider sampling of road segments within the road segment, because virtually any vehicle on the road is able to serve as a collection vehicle. However, a passive collection approach such as this may present its own set of technical challenges. First, depending on an image-capture device's image capture parameters (e.g., capture rate, resolution, image dimensions, etc.) and the amount of time that each image-capture device spends capturing image data for a road network, a given image-capture device may end up passively capturing a very large volume of image data that exceeds the volume of image data that can practically be uploaded by the image-capture device. To illustrate with an example, an image-capture device that captures even 1 image per second at an average file size of 4 MB per image may capture over 14 GB of image data for every hour of driving activity, which will almost certainly exceed the number of images that can be practically uploaded by the image-capture device assuming that it spends more than a few hours per month on the road. Second, as the number of image-capture devices participating in the passive collection continues to grow, the total volume of image data that is collectively uploaded by the image-capture devices may also begin to exceed the volume of image data that can be practically processed, stored, and/or used by the central platform.

In order to address these and other problems presented with other possible approaches for collecting image data for a road network or other elements of interest within a real-world environment, disclosed herein is new technology for intelligently collecting image data for a real-world environment that has been passively captured by image-capture devices traversing the real-world environment in a way that properly accounts for factors such as the network bandwidth usage of such devices, back-end processing costs, and/or storage costs (e.g., in order to optimize the costs incurred from network bandwidth, back-end processing, and storage). For purposes of illustration, the disclosed technology is described in the context of collecting passively-captured data for a road network (including any real-world elements that may exist alongside a road network), but it should be understood that the disclosed technology may be utilized to collecting passively-captured data for other elements of interest within a real-world environment as well.

At a high-level, the disclosed system includes a set of image-capture devices that are configured to passively capture image data for a road network and a back-end platform comprising an "image collection pipeline" that is configured to collect passively-captured image data from the set of image-capture devices by communicating with each image-capture device over a communication path that may traverse any of various types of data networks, examples of which may include a radio access network (e.g., a cellular network), a wide area network (e.g., the Internet), a local area network, and/or a cloud network, among other possibilities. For instance, one possible communication path between an image-capture device and a back-end platform may comprise a cellular network to which the image-capture device is connected while traversing a road network, a wide area network to which the cellular network is connected, and perhaps also a cloud network (or the like) that serves to connect the back-end platform to the wide area network. Other examples of communication paths from the given image-capture device to the back-end platform are also possible.

Each of the image-capture devices may take various forms, examples of which may include smartphones or other camera-equipped devices that are capable of traversing a real-world environment in a manner that facilitates image capture of a road network (perhaps among other elements of interest within the real-world environment). For example, an image-capture device could be affixed to or otherwise positioned within a vehicle such as an automobile, a bicycle, or scooter, among various other possibilities. Further, each of the image-capture devices in the disclosed system may be installed with software that configures the image-capture device to (i) while traversing a real-world environment, passively capture image data according to some capture rate (e.g., 4 frames/second) and buffer it for some period of time, (ii) apply computer vision and/or other machine learning techniques (such as object detection and/or text recognition) to the passively-captured image data to derive certain information about that passively-captured image data, including information about detected objects in certain classes of interest (e.g., road signs, lane markings, traffic lights, etc.), (iii) transmit information about the image data being passively captured and the objects detected therein, which may be referred to herein as "image-capture metadata," to the image collection pipeline and (iv) transmit data that is indicative of (i.e., can be used to determine) device location for the image-capture device to the image collection pipeline (e.g., geospatial coordinates, camera angle, pose, bearing, speed, altitude, acceleration, inertial measurement unit (IMU) data, network connection strength, etc.), which may generally be referred to herein as "location data."

At any given time, the image collection pipeline may receive image-capture metadata and location data such as this from any of various different image-capture devices that may be traversing a road network. After receiving the image-capture metadata and location data from any given image-capture device, the image collection pipeline may begin by processing that received data, which may involve determining a location associated with each image in the image data and the objects (if any) detected therein. In turn, the image collection pipeline may apply a collection policy to the given image-capture device's processed image-capture metadata in order to determine which of the images captured by the given image-capture device should be uploaded from the given image-capture device to the image collection pipeline, and then communicate with the given image-capture device in order to facilitate such uploading.

The collection policy employed by the image collection pipeline may take any of various possible factors into account, examples of which may include (i) whether any image data has previously been collected for a road segment that is the subject of a recent capture, (ii) the "freshness" of previously-collected image data for a road segment that is the subject of a recent capture (e.g., how long ago the last collection of image data for the road segment took place), (iii) whether the processed image-capture metadata indicates a difference in detected objects between image data that has recently been captured for a road segment and previously-collected image data for that same road segment, (iv) whether the image collection pipeline has received a specific request to affirmatively collect fresh image data for a road segment, (v) the importance of a road segment that is the subject of a recent collection, and perhaps also (vi) whether the captured image data contains a threshold number of images for a road segment, among other possibilities. The particular manner in which the collection policy uses these possible factors to determine which image data to collect from the image-capture devices may take various forms, and is described in further detail below.

After the image collection pipeline has applied the collection policy based on the given image-capture device's processed image-capture metadata and selected which particular images are to be uploaded from the given image-capture device to the image collection pipeline, the image collection pipeline may then send an instruction to the given image-capture device to upload the selected images. In turn, the given image-capture device may upload the selected images (or cropped portions thereof) to the image collection pipeline by transmitting those images to the back-end platform over a communication path that may take any of the various forms described above.

In this way, the image collection pipeline may advantageously enable image data to be passively captured by image-capture devices that are traversing a real-world environment for a purpose other than planned collection by selectively determining which passively-captured images to collect in a new way that intelligently and efficiently balances between (i) the need to collect complete, accurate, and up-to-date image data for a road network (which may change over time) and (ii) the fact that it is inefficient and costly to collect every image that is passively captured by every image-capture device due to constraints on how much image data can be uploaded by an image-capture device to the back-end platform (which could be based in part on upload limits imposed by cellular provider) and/or how much image data can be processed by the back-end platform, among other possible constraints. This image collection pipeline may thus provide various benefits over existing approaches for collecting image data, which includes the ability to intelligently determine which images within a set of captured images to collect through the application of a collection policy that enables the image collection pipeline to collect images that are most relevant to other "downstream" functionality that may be carried out based on the collected images.

Some of the functionality and advantages of the disclosed image collection pipeline will now be illustrated and described with reference to FIGS. 1 and 2A-2D.

Starting with FIG. 1, one example portion of a road network 100 is shown along with an example vehicle 102 traversing that road network portion 100, where an image-capture device may be found within vehicle 102. As shown, road network portion 100 includes a set of interconnected roads that are intended to represent some set of interconnected roads that could exist in the real world. These roads may be broken up into road segments that represent discrete parts of road network portion 100, examples of which may include road segments 110, 120, 130, and 140. Further, each road segment in road network portion 100 could have one or more road elements present associated with them, examples of which may include road signs (e.g., stop signs, crosswalk signs, speed limit signs, etc.), traffic lights, and lane markings, among others.

In accordance with the present disclosure, vehicle 102 could be equipped with an image-capture device that is configured to passively capture image data as vehicle 102 traverses road network portion 100, and the aspects of road network portion 100 that are captured by the image-capture device as image data may take various different forms depending on the vehicle's location and direction of travel (which need not be planned in advance).

As one example, FIG. 1 shows that while vehicle 102 is traversing road segment 110, the image-capture device within vehicle 102 may passively capture a viewpoint that shows an intersection between road segment 110 and another road segment that includes a stop sign along road segment 110.

As another example, FIG. 1 shows that while vehicle 102 is traversing road segment 120, the image-capture device within vehicle 102 may passively capture a viewpoint that shows an intersection between road segment 120 and another road segment that includes traffic light along road segment 120.

As yet another example, FIG. 1 shows that while vehicle 102 is traversing road segment 130, the image-capture device within vehicle 102 may passively capture a viewpoint that shows a crosswalk sign somewhere along road segment 130.

As still another example, FIG. 1 shows that while vehicle 102 is traversing road segment 140, the image-capture device within vehicle 102 may passively capture a viewpoint that shows an intersection between road segment 140 and another road segment that does not include any road signs or traffic lights along road segment 140.

A road network and its road segments may take various other forms as well.

As noted above, an image-capture device operating in accordance with the present disclosure may passively capture image data in an automatic manner according to some capture rate, which could be at least one image per second and perhaps multiple images per second (e.g., 4 images per second). Thus, as a vehicle traverses a road network, an image-capture device within the vehicle may capture a very large volume of images. Indeed, even over the course of a single road segment within a road network, an image-capture device within a vehicle (such as vehicle 102) may capture hundreds if not thousands of images for the road segment, and in practice, the vehicle traversal of that single road segment may only make up one small portion of its driving activity for a given day. In this respect, an image-capture device operating at a capture rate of 4 images/second may capture up to 14,400 images for every hour of driving activity. Further, in accordance with the present disclosure, there will preferably be many different image-capture devices functioning to passively capture image data for a road network during a given period of time so that image data for a greater extent of the road network can be captured, which only causes the volume of image data to grow exponentially. It is for these reasons that it may be impracticable (if not impossible) to collect each image from each image-capture device that is configured to passively capture image data for a road network.

As noted above, the image collection pipeline disclosed herein addresses these problems by applying a collection policy that enables the image collection pipeline to intelligently determine which of the captured images should be collected from the image-capture devices and then cause the image-capture devices to upload only those captured images (or cropped portions thereof) while allowing the other captured images to be discarded by the image-capture devices. Some examples of how such a collection policy may be utilized to collect image data captured by the image-capture device within vehicle 102 of FIG. 1 will now be described with reference to FIGS. 2A-2D.

Figure 2A:
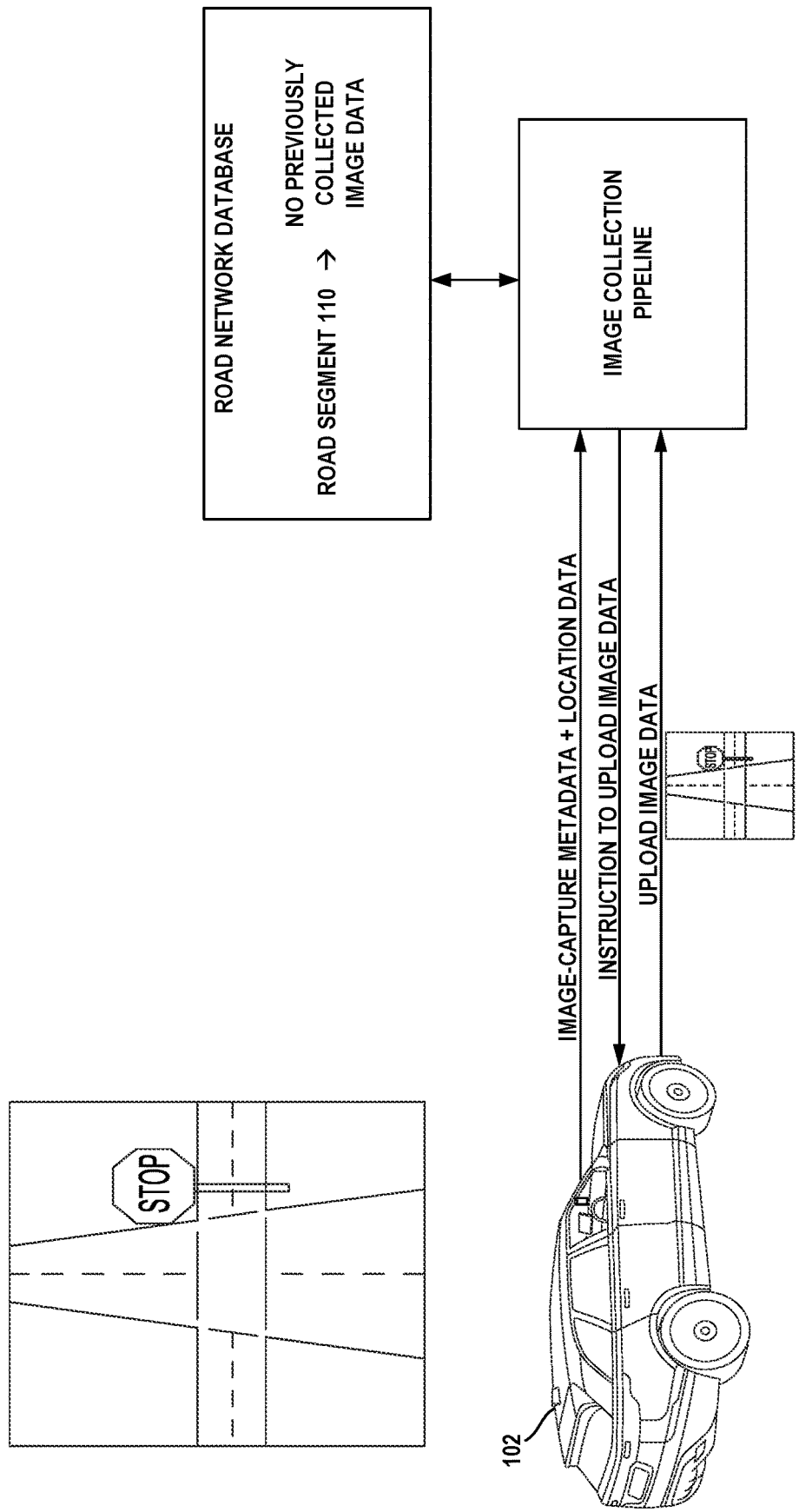
FIG. 2A is a diagram that illustrates one example of how an example collection policy is utilized to collect image data captured by an image-capture device within a vehicle.

FIG. 2A shows a first example where the image-capture device in vehicle 102 has passively captured at least a first image that corresponds to the viewpoint along road segment 110 shown in FIG. 1, which comprises an intersection between road segment 110 and another road segment that includes a stop sign along road segment 110. After passively capturing the first image, the image-capture device may perform object detection on the first image, which may result in the detection of a stop sign in the first image, and thereafter may then send image-capture metadata and location data to the image collection pipeline that includes (i) image-capture metadata for the first image and (ii) location data for the image-capture device from around the time that the image-capture device captured the first image. In turn, the image collection pipeline may process the received data and then apply a collection policy that involves (i) evaluating whether any image data has previously been collected for road segment 110 that is represented by the first image, and (ii) if there has been no image data previously been collected for road segment 110, determine that the first image should be collected from the image-capture device within vehicle 102. After making this determination, the image collection pipeline may send a communication to the image-capture device within vehicle 102 that instructs the image-capture device to upload the first image to the image collection pipeline, which may cause the image-capture device within vehicle 102 to subsequently upload the first image (perhaps along with other captured images and/or other related data) to the image collection pipeline.

Figure 2B:
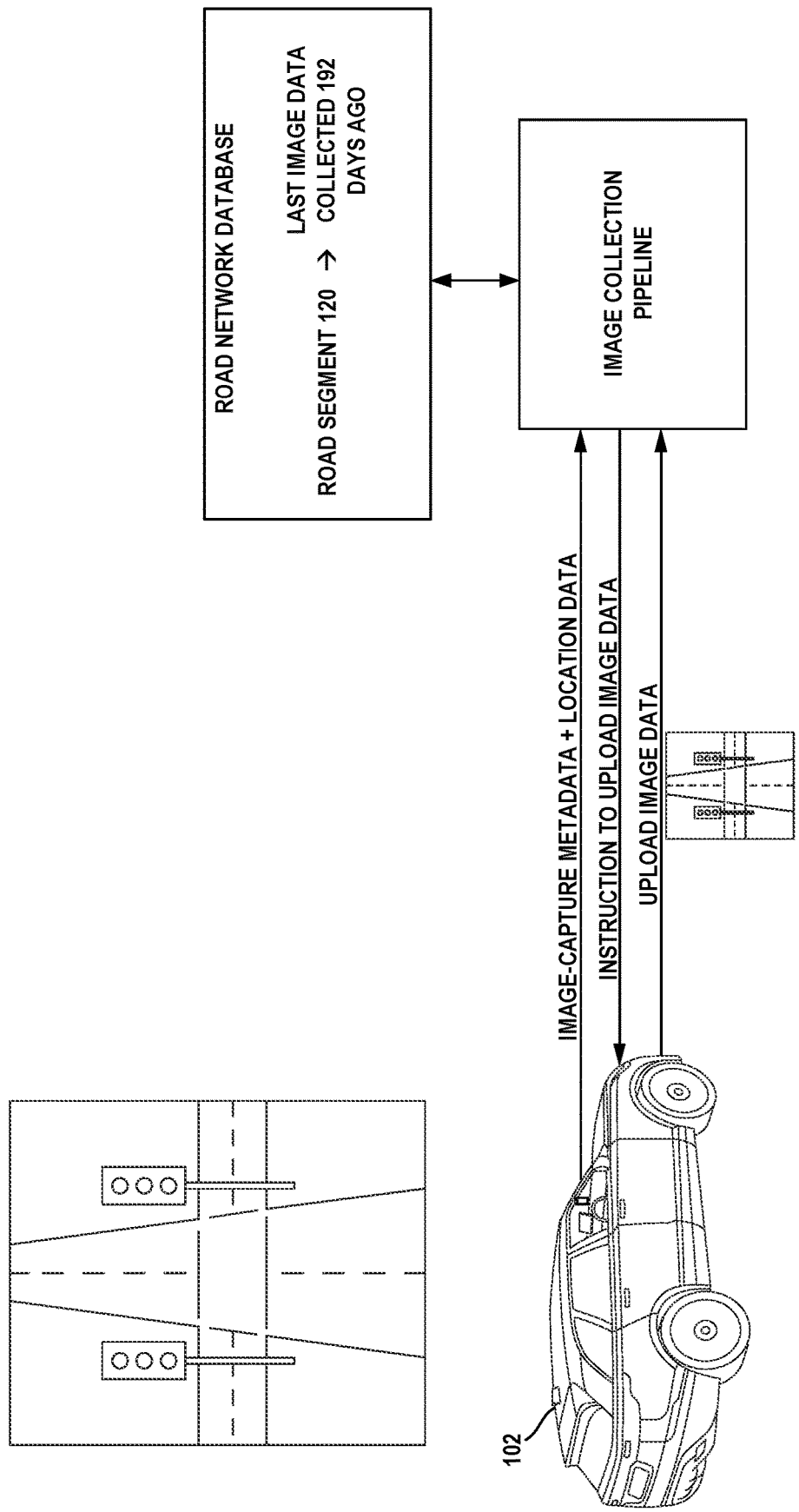
FIG. 2B is a diagram that illustrates one example of how an example collection policy is utilized to collect image data captured by an image-capture device within a vehicle.

FIG. 2B shows a second example where the image-capture device in vehicle 102 has passively captured at least a second image that corresponds to the viewpoint along road segment 120 shown in FIG. 1, which comprises an intersection between road segment 120 and another road segment that includes a traffic light along road segment 120. After passively capturing the second image, the image-capture device may perform object detection on the second image, which may result in the detection of a traffic light in the second image, and thereafter may then send image-capture metadata and location data to the image collection pipeline that includes (i) image-capture metadata for the second image and (ii) location data for the image-capture device from around the time that the image-capture device captured the second image. In turn, the image collection pipeline may process the received data and then apply a collection policy that involves (i) evaluating whether image data has been collected for road segment 120 within some period of time (e.g., six months), and (ii) if image data has not been collected for road segment within that period of time, determining that the second image should be collected from the image-capture device within vehicle 102. After making this determination, the image collection pipeline may send a communication to the image-capture device within vehicle 102 that instructs the image-capture device to upload the second image to the image collection pipeline, which may cause the image-capture device within vehicle 102 to subsequently upload the second image (perhaps along with other captured images and/or other related data) to the image collection pipeline.

Figure 2C:
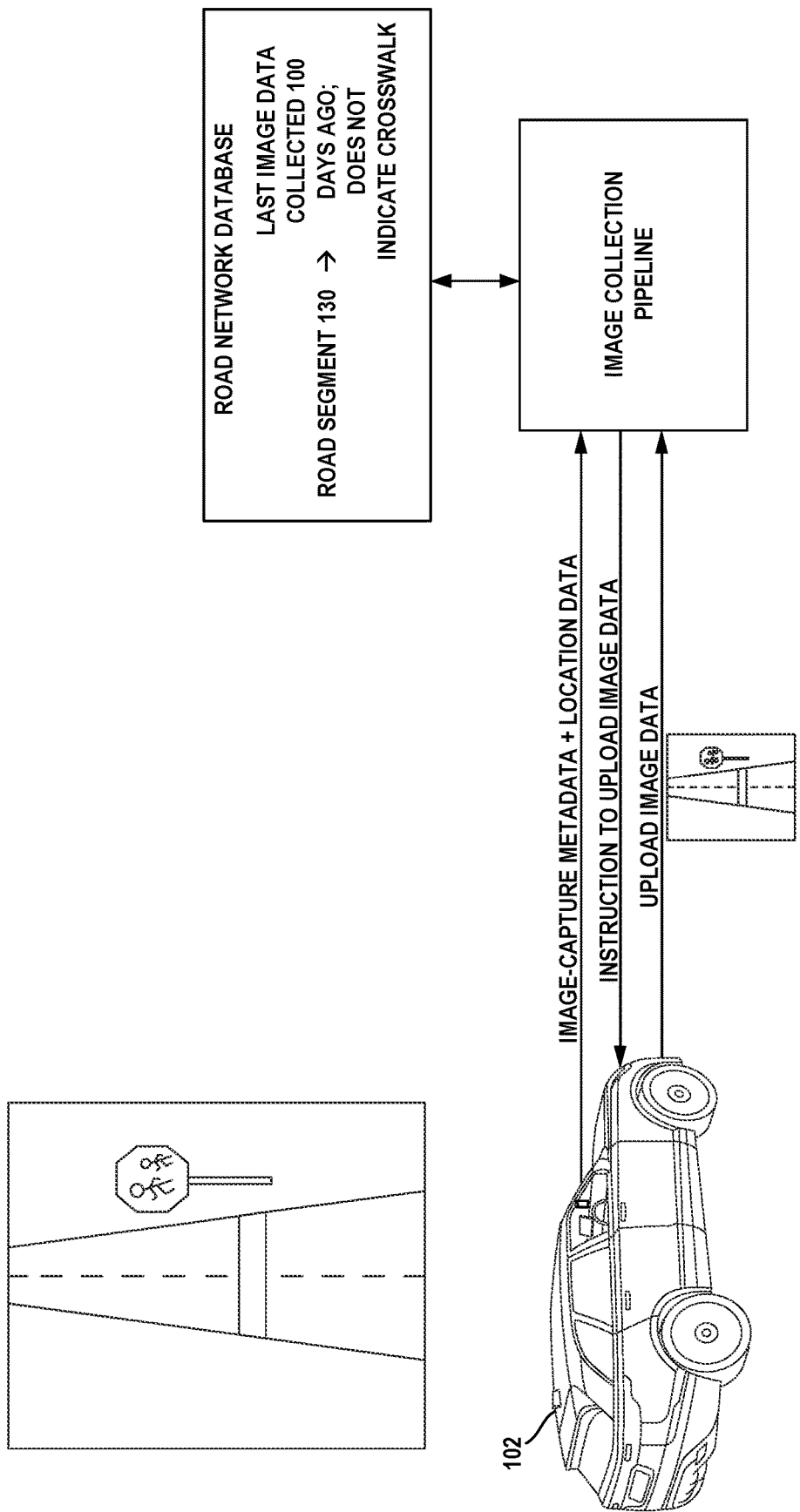
FIG. 2C is a diagram that illustrates one example of how an example collection policy is utilized to collect image data captured by an image-capture device within a vehicle.

FIG. 2C shows a third example where the image-capture device in vehicle 102 has passively captured at least a third image that corresponds to the viewpoint along road segment 130 shown in FIG. 1, which comprises an intersection between road segment 130 and another road segment that includes a crosswalk sign along road segment 130. After passively capturing the third image, the image-capture device may perform object detection on the third image, which may result in the detection of a crosswalk sign in the third image, and thereafter may then send image-capture metadata and location data to the image collection pipeline that includes (i) image-capture metadata for the third image and (ii) location data for the image-capture device from around the time that the image-capture device captured the third image. In turn, the image collection pipeline may process the received data and then apply a collection policy that involves (i) evaluating whether existing image data for road segment 130 in a road network database indicates that a crosswalk sign is present, and (ii) if the existing image data for road segment 130 does not indicate that a crosswalk is present within road segment 130, determining that the third image should be collected from the image-capture device within vehicle 102. After making this determination, the image collection pipeline may send a communication to the image-capture device within vehicle 102 that instructs the image-capture device to upload the third image to the image collection pipeline, which may cause the image-capture device within vehicle 102 to subsequently upload the third image (perhaps along with other captured images and/or other related data) to the image collection pipeline.

Figure 2D:
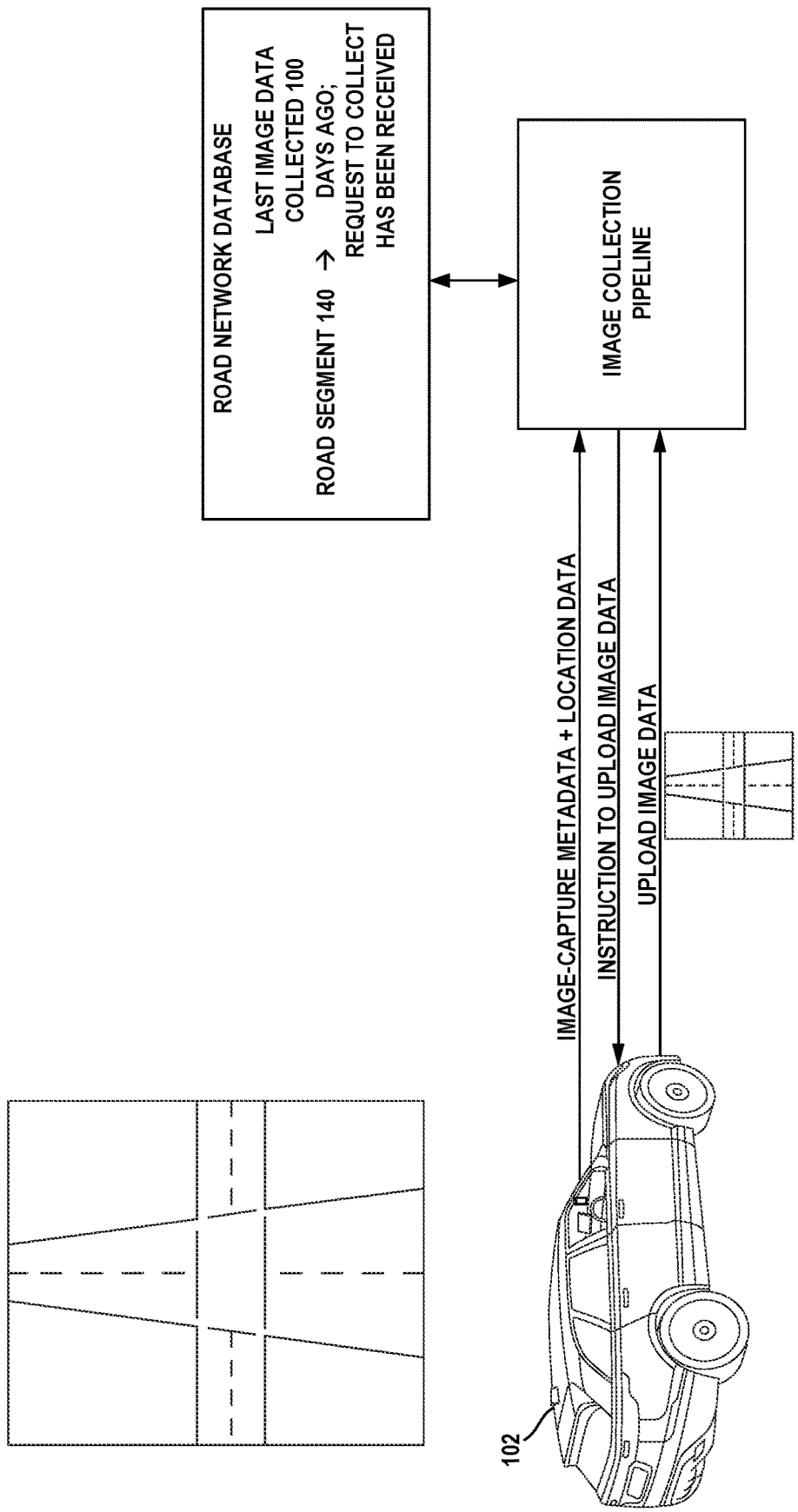
FIG. 2D is a diagram that illustrates one example of how an example collection policy is utilized to collect image data captured by an image-capture device within a vehicle.

FIG. 2D shows a fourth example where the image-capture device in vehicle 102 has passively captured at least a fourth image that corresponds to the viewpoint along road segment 140 shown in FIG. 1, which comprises an intersection between road segment 140 and another road segment. After passively capturing the fourth image, the image-capture device may perform object detection on the fourth image, which may result in the detection of no road elements in the fourth image, and thereafter may send image-capture metadata and location data to the image collection pipeline that includes (i) image-capture metadata for the fourth image and (ii) location data for the image-capture device from around the time that the image-capture device captured the fourth image. In turn, the image collection pipeline may process the received data and then apply a collection policy that involves (i) evaluating whether a request to collect image data for road segment 140 has been received, and (ii) if a request to collect image data for road segment 140 has been received, determine that the fourth image should be collected from the image-capture device within vehicle 102. After making this determination, the image collection pipeline may send a communication to the image-capture device within vehicle 102 that instructs the image-capture device to upload the fourth image to the image collection pipeline, which may cause the image-capture device within vehicle 102 to subsequently upload the fourth image (perhaps along with other captured images and/or other related) to the image collection pipeline.

It should be understood that FIGS. 2A-2D merely describes a few representative examples of the types of factors that may be evaluated by the image collection pipeline disclosed herein when applying a collection policy to determine which image data to selectively collect from image-capture devices, and that various other factors (or combinations of factors) may be considered as well. Further, it should be understood that other various of the functionality described above may be possible as well—including but not limited to a variation whereby the image-capture device within vehicle 102 uploads cropped portions of certain images (e.g., cropped portions corresponding to detected objects or the like) as opposed to sending the full images and/or a variation whereby the image-capture device is also configured to run its own local collection policy that forms a basis (either alone or in combination with the remote collection policy) for the determination of which images are to be uploaded to the image collection pipeline.

The image data for a road network that is collected by the image collection pipeline disclosed herein may in turn be utilized to enable and facilitate various other "downstream" functionality that is carried out based on that image data.

As one possibility, a map update pipeline (which may be implemented at the same computing platform as the disclosed image collection pipeline or a different computing platform) may utilize the image data collected by the disclosed image collection pipeline to carry out certain functionality related to updating a map. In this respect, a map update pipeline may be configured to (i) utilize the image data collected by the disclosed image collection pipeline as a basis for generating certain "map update tasks" that each define to a given activity for reviewing and evaluating whether a given aspect of a map should be updated, (ii) optionally prioritize the generated tasks according to some prioritization scheme, (iii) assign the generated (and potentially prioritized) tasks to one or more individuals that are tasked with reviewing and evaluating map data, which may be referred to herein as "curators," (iv) interact with each curator (e.g., via a curator's client station) to obtain feedback regarding each curator's assigned tasks, and (v) use the feedback obtained from each curator as a basis for updating the map. Additionally, in at least some implementations, the map update pipeline may optionally be configured such that, prior to prioritizing and/or assigning the generated tasks (or at least a subset of the generated tasks) to the one or more curators, the map update pipeline may evaluate whether the generated tasks meet criteria for implementing an automatic map update, and for any generated task that meets such criteria, the map update pipeline may cause the map to be updated automatically based on the generated task as opposed to assigning the task to a curator for review and evaluation.

In this way, the map update pipeline may advantageously enable map update tasks to be completed in a new way that intelligently and efficiently balances between the need to generate and assign map update tasks to one or more curators and the fact that it is impractical (if not impossible) for the one or more curators to complete every generated map update task due to constraints on the availability or specialty of the one or more curators. Thus, in addition to leveraging the benefits of the image collection pipeline, the disclosed map update pipeline may also provide various benefits over existing approaches for updating maps, which includes the ability to intelligently prioritize the generated map update tasks in a way that allows the one or more curators to complete higher priority map update tasks first (e.g., map update tasks that considered to be more critical, urgent, and/or impactful to consumers of the map).

As another possibility, a map evaluation pipeline (which may be implemented at the same computing platform as the disclosed image collection pipeline or a different computing platform) may cause the image collection pipeline to collect image data for certain road segments and then utilize the collected image data to carry out certain functionality related to evaluating a map. In this respect, a map evaluation pipeline may be configured to (i) employ a sampling mechanism to select road segments within a road network that are to be used for map evaluation, (ii) cause the disclosed image collection pipeline to collect image data that is passively captured for the selected road segments, which may in turn be provided to the map evaluation pipeline, (iii) utilize the image data that was collected for the selected road segments during some window of time (which will typically only cover a subset of the total set of selected road segments given the passive nature of the image capture) as a basis for generating "map evaluation tasks" that each define a task for evaluating the accuracy of previously-encoded map data for a given road segment, (iv) assign the generated tasks to one or more curators for evaluation, (v) interact with the one or more curators (e.g., via a curator's client station) to obtain feedback regarding the assigned tasks, and (vi) derive one or more accuracy metrics based on the feedback from the one or more curators.

In this way, the map evaluation pipeline may advantageously enable map evaluation tasks to be completed in a new way that intelligently and efficiently balances between the need to evaluate the accuracy of a map through the generation and completion of map evaluation tasks and the fact that it is impractical (if not impossible) for the one or more curators to complete every generated map evaluation task due to constraints on the availability or specialty of the one or more curators. Thus, in addition to leveraging the benefits of the image collection pipeline, the disclosed map evaluation pipeline may provide various benefits over existing approaches for evaluating maps, which includes providing a more objective framework for evaluating the accuracy of maps. In this respect, this map evaluation pipeline's utilization of a sampling mechanism in conjunction with the data collected from the disclosed image collection pipeline to provide the one or more curators with accurate representation image data results in a more accurate evaluation of the image data.

It should be understood that the image data collected by the disclosed image capture pipeline may be used for various other purposes as well, including but not limited to point of interest (POI) databases and/or applications that utilize image data to display aspects of a real-world environment (e.g., as street imagery).

Figure 3:
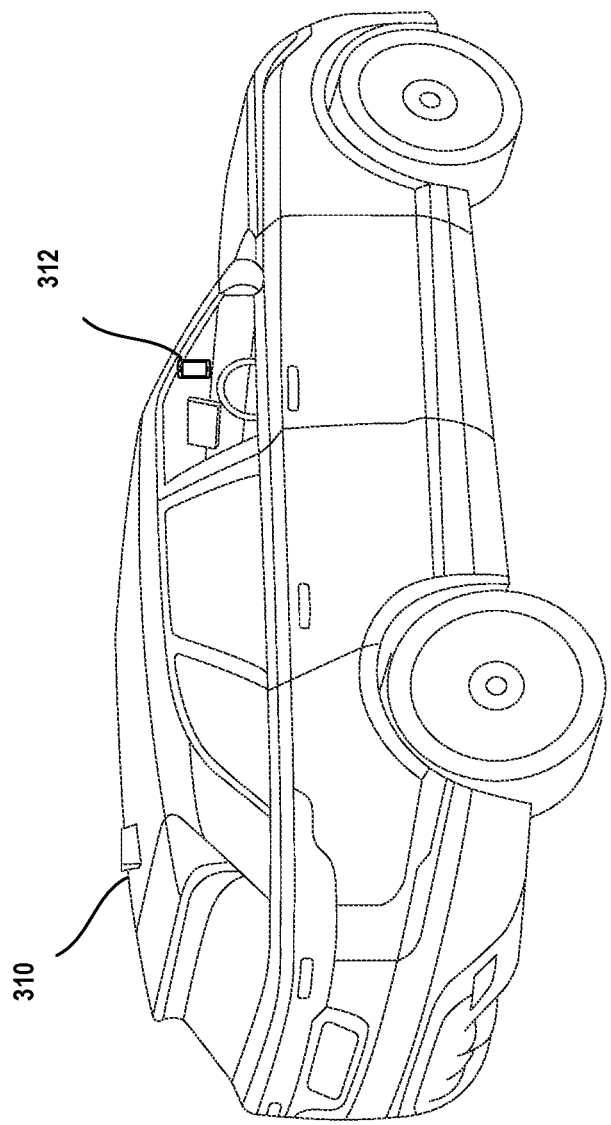
FIG. 3 is a diagram that illustrates an example image-capture device within a vehicle.

As noted above, in accordance with the present disclosure, image data for a road network may be captured by a set of image-capture devices, each of which may be affixed to or otherwise positioned within a vehicle such as an automobile, bicycle, scooter, or the like that is capable of traversing the road network. To illustrate with one possible example, FIG. 3 shows an example vehicle 310 having an example image-capture device 312 that is within vehicle 310.

Broadly speaking, example vehicle 310 may be any vehicle that is capable of traversing a road network, which may take a form similar to that discussed above with reference to FIG. 1. As just one example, vehicle 310 may be one of a number of vehicles operating in a rideshare platform, which may be beneficial for image data collection insofar that vehicles operating in a rideshare platform tend to drive more miles and traverse a larger extent of a road network on any given day. However, in general, vehicle 310 may be any vehicle that traverses a road network for a purpose other than a planned collection of image data. In this respect, as some non-limiting examples, vehicle 310 could be (i) a long-haul truck, (ii) a taxi, (iii) a car operating for a private service outside of a rideshare platform, (iv) a bus or other form of public transportation vehicle, (v) a rental car, or (vi) any other vehicle operated by an individual that has agreed to passively capture image data while driving (e.g., a bicycle, scooter, or other apparatus capable of transportation). However, regardless of the form vehicle 310 takes, image capture device 312 is deployed in vehicle 310 in a manner that allows it to passively capture image data while vehicle 310 is traversing the road network.

In general, image-capture device 312 may comprise any device that is capable of capturing image data for a road network. In this respect, image-capture device 312 may be capable of capturing image data from in front of vehicle 310, from the side of vehicle 310, from behind vehicle 310, or any combination thereof. Such an image-capture device 312 may take various forms. As one example, image-capture device 312 may be a standalone device that is capable of capturing image data for a road network, such as a smartphone, tablet, dashcam, or other camera-equipped device that can be placed somewhere within a vehicle (e.g., by being mounted on a dashboard, windshield, or exterior body of a vehicle). As another example, image-capture device 312 may be a device integrated into vehicle 310 that is capable of capturing image data for a road network, such as a camera installed into the dashboard, mirror, or exterior body of vehicle 310. Image-capture device 312 may take other forms as well. One possible example of the components that may be included in an image-capture device, such as image-capture device 312, is illustrated and described below with reference to FIG. 7.

Further, image-capture device 312 may be installed with software that configures image-capture device 312 to perform any of the various functions disclosed herein.

As one example, image-capture device 312 may be configured to passively capture image data in an automatic manner while vehicle 310 traverses a road network. In this respect, image-capture device 312 may be configured to passively capture image data at a particular capture rate that is defined by the software running on image-capture device 312, which could either be a fixed rate or a dynamic rate that is defined based on various factors related to image-capture device 312 (e.g., processor usage, data storage usage, cellular data usage, etc.) and/or the environment in which image-capture device 312 is operating (e.g., location, time of day, etc.). Further, the particular rate at which image-capture device 312 captures image data could comprise any number of frames per second that may be suitable for passive capture of image data, including rates ranging anywhere from less than 1 frame per second to many frames per second, and in as one representative example, the capture rate of image-capture device 312 may fall within a range of 1 frame per second to 4 frames per second. However, other capture rates are possible as well.

After passively capturing each respective image, image-capture device 312 may buffer the respective image for some period of time, which could correspond to an amount of time that is typically required for a back-end platform to determine whether the respective image should be uploaded to the back-end platform, although the buffer time of each respective image could be dictated by various other factors as well (e.g., data storage usage on image-capture device 312). Further, in at least some embodiments, image-capture device 312 may be configured to remove images from its buffer based on something other than a buffer time, such as a communication from the back-end platform from which it can be determined that certain images no longer need to be maintained by image-capture device 312.

As another example, image-capture device 312 may be configured to apply computer vision and/or other machine learning techniques to the passively-captured image data. For instance, as one possibility, image-capture device 312 may be configured to apply object detection to the passively-captured image data to detect objects that are represented within the image data. In this respect, the object detection functionality applied by image-capture device 312 may enable it to identify and locate objects in the captured image data. Further, in practice, the object detection functionality applied by image-capture device 312 may be configured to detect objects in a particular set of classes, which may be determined based on various factors. For instance, one possible factor dictating which classes are to be detected by the object detection functionality applied by image-capture device 312 could be the intended use case for the image data being captured. To illustrate with an example, if the image data being collected for purposes of providing it to a map update pipeline, image-capture device 312 may be configured to detect objects in classes that are relevant to evaluating and implementing map updates, such as road signs, traffic signals, and lane markings, among various other possible object classes that could be utilized to facilitate the image collection functionality disclosed here.

Further, the object detection functionality applied by image-capture device 312 may take any of various forms. As one example, the object detection functionality may utilize a technique such as Convolutional Neural Network (CNN) methods (e.g., Region-based CNN (R-CNN), Region-based Fully Convolutional Network (R-FCN), Fast R-CNN, and/or Faster R-CNN), among other possible techniques (e.g., Histogram of Oriented Gradients (HOG), Single Shot Detector (SSD), Spatial Pyramid Pooling (SPP-net), and You Only Look Once (YOLO)).

Image-capture device 312 may be configured to apply other types of computer vision and/or other machine learning techniques to the passively-captured image data as well, including but not limited to text recognition techniques for interpreting textual information found on real-world elements such as road signs, buildings, etc.

As yet another example, image-capture device 312 may be configured to generate image-capture metadata and then transmit that image-capture metadata to a back-end platform. This image-capture metadata may take various forms. As one possibility, such image-capture metadata may include information about image-capture device 312 itself, such as an identifier associated with image-capture device 312. As another possibility, such image-capture metadata may include information about the image data being captured by image-capture device 312, which may include some or all of the following information for each respective image captured by image-capture device 312: (i) an identifier associated with the respective image, (ii) a timestamp indicating the time at which the respective image was captured, and (iii) a respective set of object information for each object (if any) detected in the respective image, which may include an indication of the detected object's classification (e.g., road sign, lane marking, etc.), an indication of the detected object's location within the respective image, and/or a confidence score that indicates how confident image-capture device 312 is in its detection and/or classification of the object. The image-capture metadata may take other forms as well. Further, in practice, the image-capture metadata may be structured and/or formatted in various manners prior to being transmitted to the image collection pipeline, and in at least one example, image-capture device 312 may batch the image-capture metadata for multiple consecutive images together into a single data structure that is then transmitted to the image collection pipeline.

As still another example, image-capture device 312 may be configured to capture location data for image-capture device 312 and transmit that location data to a back-end platform. The location data may take various forms. As one example, such location data may take the form of a time series of coordinates where each coordinates represents the device's location at a respective time according to a reference coordinate system (e.g., a global coordinate system such as the one used by a Global Positioning System (GPS)). In this respect, each coordinate within the time series of coordinates may have an associated timestamp that indicates the time at which the coordinate was captured. As another example, such location data may take the form of a time series of other data from which the image-capture's location can be derived, examples of which may include camera angle, pose, bearing, speed, altitude, acceleration, IMU data, and/or network connection strength, among other possibilities. The location data may take other forms as well. Further, in practice, the location data for image-capture device 312 may be captured according to some capture rate, which could either be the same as the capture rate for image data or different from the capture rate for image data. In this respect, the location data that is captured by image-capture device 312 may not be time aligned with the image data captured by image-capture device 312, which may give rise to a need for additional processing in order to associate the image-capture metadata with location data.

In practice, image-capture device 312 may transmit the image-capture metadata and location data to the back-end platform at various times. In one implementation, image-capture device 312 may transmit the image-capture metadata and location data to the back-end platform in periodic intervals that may be defined based on time (e.g., once an hour, day, or week, etc.) or an amount of data that has been captured since the last transmission (e.g., 500 MB, 1 GB, 2 GB, etc.). In such an implementation, image-capture device 312 may transmit the image-capture metadata and location data in batches, where each transmission contains multiple sets of image-capture metadata and location data. In another implementation, image-capture device 312 may transmit the image-capture metadata and location data to the back-end platform as it is captured. In this respect, image-capture device 312 may transmit the image-capture metadata and location data as soon as possible after capturing the image-capture metadata and location data (e.g., as soon as image-capture device 312 establishes a connection over which it can transmit the image-capture metadata and location data). Image-capture device 312 may transmit the image-capture metadata and location data to the back-end platform at other times as well.

Further, in practice, image-capture device 312 may transmit the image-capture metadata and location data to the back-end platform in various ways. In one implementation, image-capture device 312 may transmit the image-capture metadata and location data over a communication path that may include any of various types of data networks and/or communication links. The one or more data networks could be a radio access network (e.g., a cellular network), a wide area network (e.g., the Internet), a local area network, and/or a cloud network, among other possibilities.

Further yet, while image-capture device 312 may be configured to transmit both the image-capture metadata and location data to the back-end platform, in practice, it should be understood that these may be discrete sets of data that are captured and maintained by image-capture device 312 separately. In this respect, image-capture device 312 could be configured to transmit the image-capture metadata and the location data to the back-end platform either during a single communication session with the back-end platform or over the course of multiple separate communication sessions with the back-end platform (e.g., one session for the metadata and one for the location data) that could take place at the same time or different times, among other possibilities as to the particular manner in which the image-capture metadata and the location data could be transmitted from image-capture device 312 to the back-end platform.

As explained in further detail below, image-capture device 312 may also be configured to upload its passively-captured image data to a back-end platform comprising an image collection pipeline. In accordance with the present disclosure, image-capture device 312 may perform this function in response to receiving an instruction from an image collection pipeline to upload certain image data, although it is possible that image-capture device 312 may perform this function at other times and for other purposes as well—including but not limited to the possibility that image-capture device 312 may be configured to apply a local collection policy to at least some of its passively-captured image data in order to selectively determine whether certain passively-captured image data should be "pushed" to a back-end platform as opposed to being sent in response to receiving an instruction from a back-end platform that is applying a remote collection policy.

Image-capture device 312 may be configured to perform any of various other functions as well.

Figure 4:
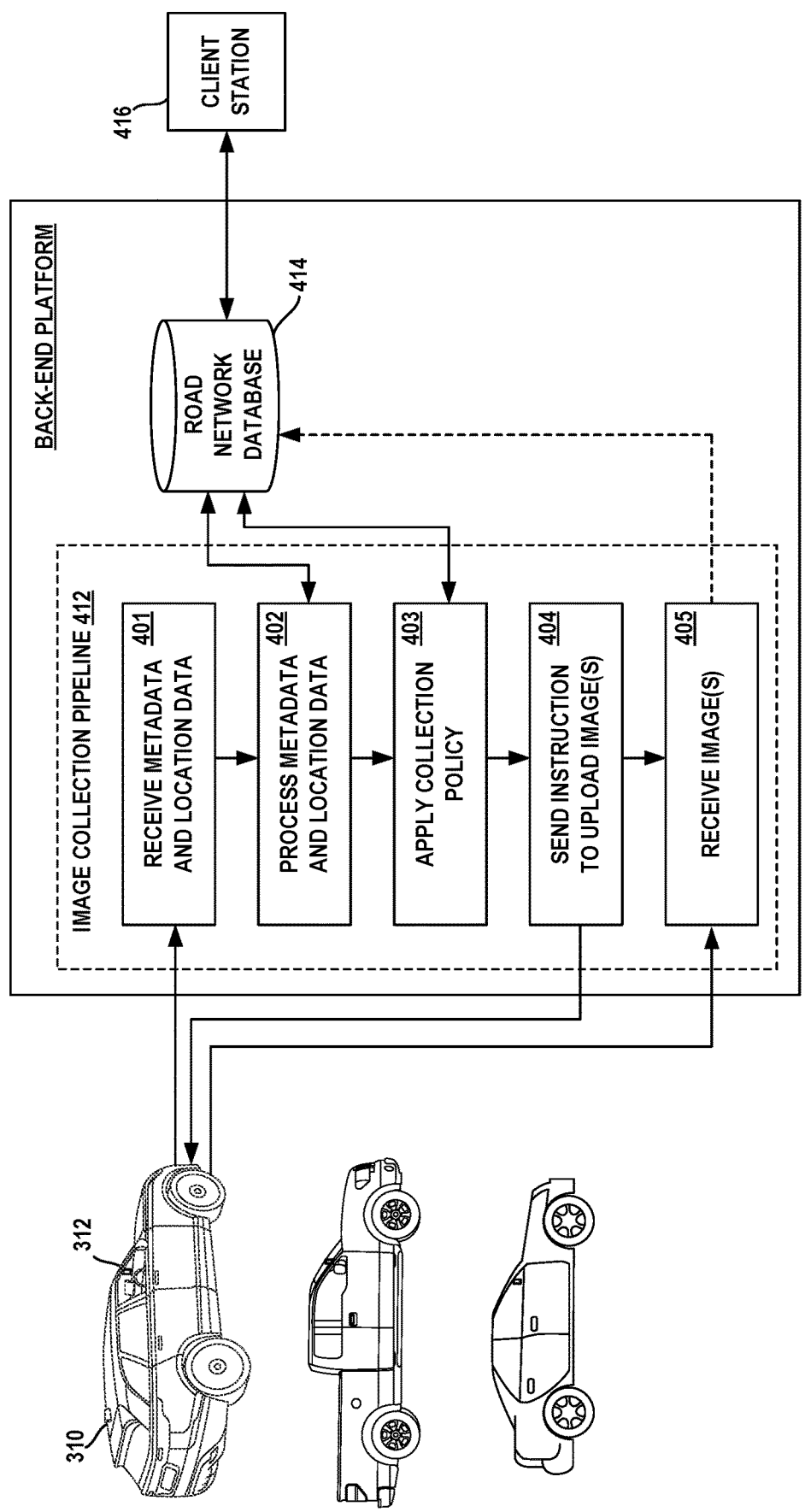
FIG. 4 is a diagram that illustrates one example of an image collection pipeline that is utilized to collect captured image data.

Turning to FIG. 4, a block diagram is shown that illustrates the functionality of one possible example of the disclosed image collection pipeline, which is shown as an image collection pipeline 412. In practice, image collection pipeline 412 is shown as being implemented at an example back-end platform, which may generally comprise one or more computing systems that have been installed with software (e.g., program code) for carrying out the functions disclosed herein. One possible example of the components that may be included in a computing platform that implement an image collection pipeline, such image collection pipeline 412, is illustrated and described below with reference to FIG. 8.

As explained above, in accordance with the present disclosure, image-capture devices that are traversing a real-world environment may be configured to passively capture image data for a road network within that real-world environment. As an illustrative example, FIG. 4 shows three representative examples of such image-capture devices, each of which is positioned within a respective vehicle. In this respect, each image-capture device may send image-capture metadata and location data to image collection pipeline 412 over a respective communication path. In turn, image collection pipeline 412 may (i) receive such image-capture metadata and location data from each of the image-capture devices, (ii) perform various functions based on the received data in order to determine which image data to collect from each of the image-capture devices, and (iii)

collect certain image data from each of the image-capture devices. The functionality of the image collection pipeline 412 will now be described with reference to one example image-capture device within one example vehicle, which is shown in FIG. 4 to be image-capture device 312 within vehicle 310, but it should be understood that the functionality described below may likewise be carried out for any other image-capture device that sends image-capture metadata and location data to image collection pipeline 412.

Beginning at block 401 of FIG. 4, image collection pipeline 412 may receive, from image-capture device 312, (i) image-capture metadata for a given set of images that were passively captured by image-capture device 312 during some window of time and (ii) location data for image-capture device 312 from around the window of time during which image-capture device 312 had captured the given set of images. In general, image collection pipeline 412 may receive the image-capture metadata and location data from image-capture device 312 over a communication path that may include any of various types of data networks and/or communication links. The one or more data networks could be a radio access network (e.g., a cellular network), a wide area network (e.g., the Internet), a local area network, and/or a cloud network, among other possibilities. Further, in practice, the image-capture metadata and the location data could be received from image-capture device 312 either during a single communication session with image-capture device 312 or over the course of multiple separate communication sessions with image-capture device 312 (e.g., one session for the metadata and one for the location data) that could take place at the same time or different times, among other possibilities as to the particular manner in which the image-capture metadata and the location data could be received from image-capture device 312.

At block 402, image collection pipeline 412 may process the received image-capture metadata and received location data to determine a respective capture location associated with each image in the given set of images that was passively captured by image-capture device 312. This function may take various forms.

As one possibility, image collection pipeline 412 may begin by using the location data as a basis for determining a time sequence of device locations for image-capture device 312 during the window of time when the given set of images were captured. This determination of the time sequence of device locations for image-capture device 312 may be carried out in various ways. In some implementations, image collection pipeline 412 may apply a localization technique to the received location data to derive a time sequence of device locations for image-capture device 312 based on that location data. In this respect, the particular localization technique that is used to derive the time sequence of device locations for image-capture device 312 may take any of various forms, which may depend at least in part on the nature of the location data that is received from image-capture device 312. However, in other implementations where the received location data comprises a time sequence of coordinates for image-capture device 312 (e.g., GPS coordinates or the like), image collection pipeline 412 may use this time sequence of coordinates a time sequence of device locations for image-capture device 312.

Further, in some implementations, image collection pipeline 412 may be configured to apply map-matching to the determined time sequence of device locations for image-capture device 312 in order to improve the accuracy of those device locations. In general, applying map-matching may involve using information about the road network (which may be stored in the road-network database 414 described in further detail below) in order to determine an updated set of device locations that are each mapped (or "snapped") to a given road segment within the road network.

After the time sequence of device locations for image-capture device 312 are determined based on the received location data, image collection pipeline 412 may then determine a device location corresponding to each image in the given set of images. In general, the function of determining a device location corresponding to a given image may involve (i) comparing a timestamp included within the received image-capture metadata for the given image against the time sequence of device locations for image-capture device 312 in order to identify one or more device locations for image-capture device 312 that are closest in time to the given image, (ii) based on the identified one or more device locations, determining a given device location that corresponds to the given image, and then (iii) establishing an association between the given image and the given device location (e.g., by adding the device location to the respective image-capture metadata for the given image or otherwise linking the device location to that to the respective image-capture metadata for the given image).

In this respect, in some circumstances, this functionality may result in an identification of one particular device location having a capture time that sufficiently matches the timestamp of the given image such that the identified device location may be determined as the given device location that corresponds to the given image without a need for further processing. In other circumstances, however, the one or more device locations that are identified as being closest in time to the capture of the given image may still not be sufficiently time aligned with the capture of the given image, in which case image collection pipeline 412 may engage in interpolation (or the like) with respect to the identified one or more device locations in order to derive a given device location that corresponds to the given image. For instance, if image collection pipeline 412 received two coordinates for image-capture device 312 having respective timestamps of 4 seconds and 6 seconds, and received image-capture metadata for the given image has a timestamp of 5 seconds, image collection pipeline 412 may interpolate between the coordinates of image-capture device 312 at 4 seconds and 6 seconds in order to derive a coordinate for image-capture device 312 at 5 seconds, which may then be designated as the device location that corresponds to the given image.

The function of determining a respective capture location associated with each image in the given set of passively-captured images may take various other forms as well. For instance, while the foregoing describes that image collection pipeline 412 may first apply map-matching to the device locations in order to generate updated device locations and may then use the updated device locations to determine the capture locations associated with the given set of images, this is merely just one implementation of how image collection pipeline 412 may determine the capture locations associated with the given set of images, and in an alternate implementation, image collection pipeline 412 could be configured to first determine capture locations associated with the given set of images based on the determined device locations for image-capture device 312 and may then apply map matching to those capture locations in order to align them with the road network. The function of determining a respective capture location associated with each image in the given set of passively-captured images may take other forms as well.

Further, image collection pipeline's function of processing the received image-capture metadata and received location data may optionally involve determining the locations of objects detected within the images, which may also involve applying a localization technique At block 403, after processing the received image-capture metadata and received location data to determine a respective capture location associated with each image in the given set of images, image collection pipeline 412 may apply a collection policy to the processed image-capture metadata in order to determine which images in the given set (if any) to collect from image-capture device 312. In this respect, applying collection policy may generally involve evaluating the processed image-capture metadata, along with certain information about the road network that is relevant to the collection policy, in order to determine which of the images in the given set (if any) qualify for collection under the collection policy. This information about the road network that may be utilized by image collection pipeline 412 when applying the collection policy may be referred to herein as "road-network data," and may be stored in road-network database 414. Such road-network data may take various forms.

As one possibility, such road-network data may include general information for each road segment within the road network, which may include some or all of (i) an identifier associated with each road segment, (ii) geospatial information (e.g., coordinates) that indicates the location and geometry of each road segment, (iii) an indication of a type, category, or other classification of the road segment, (v) an indication of a usage level of the road segment (e.g., total or average number of image-capture devices that traverse the road segment, total or average distance and/or time traveled by image-capture devices along the road segment, etc.) and (iv) an indication of an importance level of the road segment, as examples. As another possibility, such road-network data may include information about the objects that have been detected (if any) in previously-collected image for each road segment, which may comprise one or more of the following for each detected object (i) a classification of the detected object, (ii) a location of the detected object, and (iii) a confidence score associated with the detected object, among other possibilities. As yet another possibility, such road-network data may include information about the current status of image collection for each road segment, which may comprise one or more of (i) an indication whether any image data has previously been collected for the road segment, (ii) to the extent image data has previously been collected for the road segment, an indication of when the last collection of image data for the road segment took place, and (iii) an indication of whether a request has been received to affirmatively collect fresh image data for the road segment (e.g., a request from a curator or another pipeline of the back-end platform that is seeking fresh image data for the road segment). As still another possibility, such road-network data may include previously-collected image data for each road segment to the extent that such previously-collected image data available which may comprise one or more sets of images that have been collected in the past from one or more image-capture devices along with associated image-capture metadata for such images (e.g., image identifiers, timestamps, etc.). The road-network data may take other forms as well.

It should be understood that while road-network database 414 is described as a single database that contains road-network data, road-network database 414 may take the form of multiple databases. For instance, road-network database 414 could comprise one database that includes the identifying information, the object information, and the collection state information for the road segments in the road network, and then another separate database that includes the previously-collected image data for the road segments in the road network. Road-network database 414 may take other forms as well.

Further, the evaluation of the processed image-capture metadata and the road-network data that is performed by image collection pipeline 412 under the collection policy may take any of various different factors into account.

As a first possible factor, the collection policy applied by image collection pipeline 412 may involve evaluating whether any image data has previously been collected for each road segment that is the subject of the images captured by image-capture device 312, because if no image data has previously been collected for a road segment, this may dictate in favor of collecting the images that have been captured by image-capture device 312 for that road segment. Image collection pipeline 412 may perform this evaluation in various ways. As one possibility, image collection pipeline 412 may use the processed image-capture metadata to determine which road segment(s) are the subject of the images captured by image-capture device 312, and then for each such road segment, image collection pipeline 412 may (i) look up the road segment in road-network database 414, (ii) based on the stored road-network data for the road segment, determine whether any image data has previously been collected for the road segment, and (iii) if there is an absence of previously-collected image data for the road segment, flag the particular image(s) captured by image-capture device 312 for that road segment as a potential candidate for collection by image collection pipeline 412. Image collection pipeline 412 may perform this evaluation in other ways as well.

As a second possible factor, the collection policy applied by image collection pipeline 412 may involve evaluating the freshness of previously-captured image data for each road segment that is the subject of the images captured by image-capture device 312, because if image data has not been recently collected for a road segment, this may dictate in favor of collecting the images that have been captured by image-capture device 312 for that road segment. Image collection pipeline 412 may perform this evaluation in various ways. As one possibility, image collection pipeline 412 may use the processed image-capture metadata to determine which road segment(s) are the subject of the images captured by image-capture device 312, and then for each such road segment, image collection pipeline 412 may (i) look up the road segment in the road-network database 414, (ii) based on the stored road-network data for the road segment, determine the most recent date that image data was collected for the road segment, (iii) determine whether that collection date comports with certain freshness criterion that is defined by the collection policy (e.g., criterion indicating that fresh image data should be collected at least every six months for each road segment), and (iv) if that collection date does not comport with the freshness policy, flag the particular image(s) captured by image-capture device 312 for that road segment as a potential candidate for collection by image collection pipeline 412. Image collection pipeline 412 may perform this evaluation in other ways as well.

As a third possible factor, the collection policy applied by image collection pipeline 412 may involve evaluating whether, for each road segment that is the subject of the images captured by image-capture device 312, there are differences between the information about the objects detected in previously-captured image data and the objects detected in the image data captured by image-capture device 312—because any such differences for a road segment may dictate in favor of collecting the image(s) that have been captured by image-capture device 312 for that road segment. Image collection pipeline 412 may perform this evaluation in various ways. As one possibility, image collection pipeline 412 may use the processed image-capture metadata to determine which road segment(s) are the subject of the image data captured by image-captured device 312, and then for each such road segment, image collection pipeline 412 may (i) look up the road segment in the road-network database 414, (ii) based on the stored road-network data for the road segment and the processed image-capture metadata, determine whether there is a difference between the objects that were detected (if any) in the previously-collected image data for the road segment and the objects that were detected (if any) in the image(s) captured by image-captured device 312 for the road segment, and (iii) if there is a difference, flag the particular image(s) captured by image-capture device 312 for that road segment as a potential candidate for collection by image collection pipeline 412. Image collection pipeline 412 may perform this evaluation in other ways as well.

As a fourth possible factor, the collection policy applied by image collection pipeline 412 may involve evaluating whether a request has been received to affirmatively collect fresh image data for any road segment that is the subject of the image data captured by image-capture device 312 (e.g., a request from a curator or another pipeline of the back-end platform that is seeking fresh image data for the road segment), because the presence of such a request for a road segment may dictate in favor collecting the image(s) that have been captured by image-capture device 312 for that road segment. Image collection pipeline 412 may perform this evaluation in various ways. As one possibility, image collection pipeline may use the processed image-capture metadata to determine which road segment(s) are the subject of the image data captured by image-capture device 312, and then for each such road segment, image collection pipeline 412 may (i) look up the road segment in the road-network database 414, (ii) based on the stored road-network data for the road segment, determine whether a request has been received to affirmatively collect fresh image data for the road segment, and (iii) if such a request has been received for the road segment, flag the particular image(s) captured by image-capture device 312 for that road segment as a potential candidate for collection by image collection pipeline 412. Image collection pipeline 412 may perform this evaluation in other ways as well.

As a fifth possible factor, the collection policy applied by image collection pipeline 412 may involve evaluating the importance of each road segment that is the subject of the images captured by image-capture device 312, because if a road segment is of threshold importance, this may dictate in favor of collecting the image(s) that have been captured by image-capture device 312 for that road segment. Image collection pipeline 412 may perform this evaluation in various ways. As one possibility, image collection pipeline 412 may use the processed image-capture metadata to determine which road segment(s) are the subject of the image data captured by image-capture device 312, and then for each such road segment, image collection pipeline 412 may (i) look up the road segment in the road-network database 414, (ii) based on the stored road-network data for the road segment, determine whether the road segment is of threshold importance, and (iii) if the road segment is of threshold importance, flag the particular image data captured by image-capture device 312 for that road segment as a potential candidate for collection by image collection pipeline 412. In this respect, image collection pipeline 412 may determine whether the road segment is of threshold important based on any of various data that may be available for the road segment, examples of which may include an indication of the type or category of road segment, an indication of the usage level of the road segment, and/or a predetermined indication of the importance level of the road segment, among other possibilities, and the threshold that is utilized by image collection pipeline 412 to make this determination may likewise take any of various forms. Image collection pipeline 412 may perform this evaluation in other ways as well.

As a sixth possible factor, the collection policy applied by image collection pipeline 412 may involve evaluating the length of the image sequence that includes a particular image captured by image-capture device 312. Image collection pipeline 412 may perform this evaluation in various ways, one example of which is comparing the length of the image sequence that includes a particular image to a threshold. For instance, if the length of the image sequence that includes the particular image is below the threshold (e.g., the image sequence contains 4 or less images), then image collection pipeline 412 may not flag the particular image for collection. Conversely, if the length of the image sequence that includes the particular image is above the threshold (e.g., the image sequence contains 4 or more images), then image collection pipeline 412 may flag the particular image for collection.

The collection policy applied by image collection pipeline 412 may take various other factors into account as well.

A given collection policy may be defined to take any one or more of these possible factors into account when evaluating which images in the given set to collect from image-capture device 312, which may be referred to as the one of more "factors of interest" for the given collection policy, and the particular manner in which the one or more factors of interest are used by image collection pipeline 412 under the given collection policy to perform that evaluation may take various forms.

As one possible implementation, the collection policy applied by image collection pipeline 412 may comprise a policy under which each factor of interest is evaluated individually for each captured image, and if any given factor indicates that a captured image should be collected from image-capture device 312, image collection pipeline 412 may select that image for collection. For instance, when applying a collection policy that is defined to evaluate two factors of interest with respect to the images captured by image-capture device 312 (e.g., freshness and object difference), image collection pipeline 412 may function to evaluate the factors individually for each respective image captured by image-capture device 312, such that while evaluating a respective image, image collection pipeline 412 may select that respective image for collection if it satisfies either one of (i) the first factor (e.g., the respective image is for a road segment that has stale image data) or (ii) the second factor (e.g., the respective image that indicates a difference in detected objects for a road segment relative to the previously-collected image data for the road segment). In this way, the images captured by image-capture device 312 that are collected by image collection pipeline 412 may comprise a superset of the images that were designated for collection based on each of the different factors of interest that are evaluated in accordance with the collection policy.

Some illustrative examples of how such a collection policy that individually evaluates different factors of interest may be used to collect image data from image-capture device 312 were previously shown and described with reference to FIGS. 2A-2D.

As another possible implementation, the collection policy applied by image collection pipeline 412 may comprise a policy under which the factors of interest are evaluated collectively, and if the factors collectively indicate that a captured image should be collected from image-capture device 312, image collection pipeline 412 may then select that image for collection. Image collection pipeline 412 may collectively evaluate the factors of interest in various ways.

In one implementation, the function of collectively evaluating the factors of interest may involve determining a respective composite value for each image in the given set captured by image-capture device 312 based on the factors of interest and then using those respective composite values to determine which images to collect from image-capture device 312. In this respect, image collection pipeline 412 may determine a respective composite value for each captured image in various ways.

As one possibility, image collection pipeline 412 may determine a composite value for a given image by first assigning the given image a factor-specific value for each factor of interest, which could take any of various different forms depending on the factor. For instance, for some factors, the factor-specific value may be a binary value such as 0 or 1. Representative examples of such factors may include presence of a difference in detected objects between the given image and previously-captured image data (where 1 indicates that a difference has been detected and 0 indicates that no difference has been detected) and presence of a request affirmatively collect fresh image data (where 1 indicates that such a request has been received and 0 indicates that no such request has been made). However, it should be understood that these factors could alternatively or additionally be expressed in terms of categorical and/or numerical values as well (e.g., categorical or numerical values indicating the extent of the object differences and/or the time since the request to collect was received), and that at least some of the other factors discussed herein could also be expressed in terms of binary values instead of (or in addition to) being expressed in terms of categorical and/or numerical values.

For other factors, the factor-specific value may be a categorical value that is selected from a predefined set of possible numerical values that can quantify the factor, such as a predefined scale of numerical values (e.g., a scale ranging from 1 to 10). One representative example of such a factor may be road segment importance, which may be expressed in terms of a categorical value representing importance level that is selected from a predefined scale of importance levels. However, it should be understood that this factor could alternatively or additionally be expressed in terms of a binary and/or numerical value as well, and that at least some of the other factors discussed herein could also be expressed in terms of categorical values instead of (or in addition to) being expressed in terms of binary and/or numerical values.

For still other factors, the factor-specific value may be a continuous value that provides a meaningful way to quantify the factor. One representative example of such a factor may be freshness of the previously-collected image data for a road segment, which may be expressed in terms of some numerical measure of how much time has passed (e.g., number of seconds, minutes, hours, days, etc.) since the last collection of image data for the road segment However, it should be understood that this factor could alternatively or additionally be expressed in terms of a binary and/or categorical value as well, and that at least some of the other factors discussed herein could also be expressed in terms of numerical values instead of (or in addition to) being expressed in terms of binary and/or categorical values.

The factor-specific value that is assigned to the given image for each factor of interest may take other forms as well.

After image collection pipeline 412 determines the factor-specific values for the given image, image collection pipeline 412 may then use these factor-specific values to determine a composite value for the given image in any of various manners, examples of which may involve combining the factor-specific values together using mathematical operations and perhaps also weighting certain of the factor-specific values, among other possibilities.

For instance, one possible equation that can be used to determine a composite value for the given image based on its the factor-specific values may take the following form:

$$\text{Composite value} = \text{road importance} * \text{freshness} + \text{object difference} + \text{flagged for affirmative collection}$$

In this example equation, there are four factor-specific values that may each take a form that serves to appropriately quantify the factor of interest. For instance, the first factor-specific value is "road importance," which may comprise a categorical value indicating an importance level of the road segment that is the subject of the given image (e.g., a categorical value selected from a predefined scale of importance levels). The second factor-specific value is "freshness," which may comprise a numerical measure of how much time has passed (e.g., number of seconds, minutes, hours, days, etc.) since the last collection of image data for the road segment. As shown, these first two factor-specific values are multiplied together. The third factor-specific value is "object difference," which may comprise a binary value indicating whether or not there is a difference between the objects detected in the given image and the objects detected in previously-collected image data for the road subject that is the subject of the given image. This factor-specific value is added to the result of multiplying the first and second factor-specific values. Lastly, the fourth factor-specific value is "flagged for affirmative collection," which may comprise a binary value indicating whether or not a request for affirmative collection of fresh image data has been received for the road segment that is the subject of the given image. This factor-specific value is also added to the result of multiplying the first and second factor-specific values.

It should be understood that the example equation shown above is merely one possible example of an equation that may be used to determine a composite value for an image, and that various other equations may be used as well—including but not limited to equations that incorporate other factors, equations that represent the factors using factor-specific values that take other forms, and/or equations that combine the factors in other manners.

Image collection pipeline 412 may determine the respective composite values for the captured images in various other ways as well.

Image collection pipeline 412 may then use the respective composite values for the captured images in any of various ways to determine which images to select for collection from image-capture device 312.

As one possible implementation, image collection pipeline 412 may use the respective composite values assigned to the given set of images captured by image-capture device 312 (and perhaps composite values assigned to other captured images) to rank some batch of captured images and then select which images to collect based on that ranking (e.g., by selecting some specific number or some specific percentage of the "top" images within the ranking). In this respect, the batch of captured images that are ranked based on the composite values in order to select images for collection may take various forms.

For instance, image collection pipeline 412 may be configured to rank captured images separately for each image-capture device, in which case the batch of images that are ranked based on their composite values may consist entirely of images captured by image-capture device 312. In this respect, the image collection pipeline's ranking may span any of various windows of capture activity by image-capture device 312. For example, image collection pipeline 412 may be configured to engage in a new ranking-based selection of images for collection each time it receives a new set of image-capture metadata from image-capture device 312, in which case the batch of captured images that are ranked based on their composite values may simply be the given set of images that is represented by the mostly-recently received set of image-capture metadata from image-capture device 312. As another example, image collection pipeline 412 may be configured to engage in a ranking-based selection of images for collection that spans multiple different sets of image-capture metadata received from image-capture device 312, such as image-capture metadata received during a given window of time (e.g., over the course of a given number of hours, a given day, or several days), in which case the batch of captured images that are ranked based on their composite values may include the given set of images that is represented by the mostly-recently received set of image-capture metadata as well as one or more other sets of images for which image collection pipeline 412 either has received or will receive image-capture metadata during the given window of time. Other examples are possible as well.

Alternatively, image collection pipeline 412 may be configured to rank captured images across multiple different image-capture devices, in which case the batch of images that are ranked based on their composite values may comprise images captured by image-capture device 312 as well as images captured by other image-capture devices. In this respect, the image collection pipeline's ranking may span any of various image-capture devices and any of various windows of capture activity by such image-capture devices. For example, image collection pipeline 412 may be configured to engage in a ranking-based selection of images for collection that spans image-capture metadata received from a given pool of image-capture devices (e.g., image-capture devices traversing a particular portion of the road network) during a given window of time (e.g., over the course of a given number of hours, a given day, or several days), in which case the batch of captured images that are ranked based on their composite values may include the given set of images that is represented by the mostly-recently received set of image-capture metadata as well as (i) one or more other sets of images captured by image-capture device 312 for which image collection pipeline 412 either has received or will receive image-capture metadata during the given window of time and/or (ii) one or more other sets of images captured by one or more other image-captured devices for which image collection pipeline 412 either has received or will receive image-capture metadata during the given window of time. Other examples are possible as well.

As another possible implementation, image collection pipeline 412 may compare the respective composite value assigned to each captured image to a threshold composite value in order to determine which images to select for collection. For instance, if an image's composite value satisfies (e.g., meets or exceeds) the threshold composite value, image collection pipeline 412 may select that image for collection, whereas if the image's composite value does not satisfy the threshold composite value, image collection pipeline 412 may not select that image for collection. In this respect, the threshold composite value that is used for the comparison may take various forms.

In one example, the threshold composite value may be a predefined, fixed value to be applied to images captured by at least image-capture device 312 (and perhaps other image-capture devices as well) and does not change over time.

In another example, the threshold composite value may be a dynamic value to be applied to images captured by at least image-capture device 312 (and perhaps other image-capture devices as well) that changes over time based on certain factors. For instance, as one possibility, image collection pipeline 412 may be configured to update the threshold composite value to be applied to images captured by image-capture device 312 over time based on information related to the upload activity of image-capture device 312. At a high level, this may involve increasing the threshold composite value if image-capture device 312 has engaged in more upload activity than desirable during a recent window of time, which may lead to a decrease in upload activity thereafter, and decreasing the threshold composite value if image-capture device 312 has engaged in less upload activity than desirable during the recent window of time, which may lead to an increase in upload activity thereafter.

To illustrate with a specific example, consider a scenario where image-capture device 312 has a target amount of image data it can upload over the course of a given time period, such as each month (e.g., 50 gigabyte per month of image uploads). In such a scenario, image collection pipeline 412 may regularly monitor the amount of image data that has been uploaded by image-capture device 312 during the given time period to determine how that amount is trending relative to the target amount of image data that can be uploaded by image-capture device 312 during the given time period. For example, based on the image-capture device's upload activity during a first portion of the month (e.g., amount of image data that has been uploaded during the first several days of the month), image collection pipeline 412 may detect that image-capture device 312 is on pace to upload either more or less image data than its target for the month, neither of which is desirable. To offset this, image collection pipeline 412 may be configured to regularly monitor the image-capture device's recent upload activity during the given period of time, and if that upload activity suggests that image-capture device 312 is on pace to upload either more or less image data than the target during the given time period, image collection pipeline 412 may dynamically adjust the threshold composite value in a manner that is proportional to how much the image-capture device's upload activity should be changed so as to cause image-capture device 312 to start uploading of more or less images. In practice, image collection pipeline 412 could carry out this functionality of updating the threshold composite value using a PID controller, where the set point for the PID controller is determined as:

Set Point=BudgetTarget−BudgetUsed−
(DaysRemaining*GBUsedYesterday)

In this equation, "BudgetTarget" represents the total amount of image data that can be uploaded by image-capture device 312 during a given time period (e.g., 50 gigabytes per month), "BudgetUsed" represents the amount of image data that has already been uploaded by image-capture device 312 during the given time period, "DaysRemaining" represents the number of days remaining in the given time period (e.g., number of days left in the given month), and "GBUsedYesterday" represents the amount of image data that was uploaded by image-capture device 312 during the prior day—which is designed to serve as a proxy for the expected amount of image data that will be uploaded per day for the rest of the month. However, it should be understood that the set point for such a PID controller could take other forms as well.

The threshold composite value to be applied to images captured by image-capture device 312 may be updated in various other manners and/or based on various other factors as well.

Image collection pipeline 412 may evaluate the factors of interest collectively in other ways as well.

At block 404, after image collection pipeline 412 has applied the collection policy and selected which images in the given set (if any) to collect from image-capture device 312, image collection pipeline 412 may send an instruction to image-capture device 312 to upload the selected one or more images to image collection pipeline 412. In practice, this instruction may take any of various forms, including the possibility that the instruction may comprise multiple separate messages that each instruct upload of a different selected image (or subset of selected images). Further, in practice, this instruction may be sent over a communication path that may comprise any of various types of data networks and/or communication links. This instruction from image collection pipeline 412 may in turn cause image-capture device 312 to transmit the selected one or more images (or cropped portions thereof) to image collection pipeline 412, to the extent that the selected one or more images are still available to be sent by image-capture device 312. Further, in some implementations, the instruction from image collection pipeline 412 may cause image-capture device 312 to transmit additional image-capture metadata associated with the selected one or more images.

At block 405, image collection pipeline 412 may receive the selected one or more images from image-capture device 312 (or at least whichever of the selected one or more images are still available to be sent by image-capture device 312). In practice, the image-capture device's transmission of the selected one or more images may take various forms, including but not limited to the possibility that each image could be transmitted in a separate message (either during a single communication session with the back-end platform or separate communication sessions) or that multiple images could be sent in a single message. Further, in practice, selected one or more images may be received from image-capture device 312 over a communication path that may comprise any of various types of data networks and/or communication links. In this respect, the communication path over which the image data is received could be similar to the communication path over which the image-capture metadata and location data was previously received, although it could also differ.

After image collection pipeline 412 receives the image data from image-capture device 312, image collection pipeline 412 may optionally update road-network database 414 with the received image data. In this respect, image collection pipeline 412 may add the received image data to road-network database 414 for the road segments that are the subject of the selected one or more images (and perhaps also remove and/or archive previously-collected image data for such road segments). In this way, the selected one or more images may then be available to image collection pipeline 412 when applying the collection policy to image-capture metadata that is received in the future, and the image data stored in road-network database 414 may also be accessed by other downstream functionality as well.

Further, after image collection pipeline 412 receives the image data from image-capture device 312, the back-end platform may perform additional processing functions on the received image data. For instance, the back-end platform may apply computer vision or machine learning techniques to the received image data in order to derive certain information from the received image data. The computer vision or machine learning techniques applied to the received image data by the back-end platform may take various forms. As one possibility, the computer vision or machine learning techniques may involve performing object detection on the received image data. One reason the back-end platform may perform object detection on the received image data is because, in practice, the back-end platform may be capable of performing object detection in a more accurate way than the image-capture device that captured the image. As another possibility, the computer vision or machine learning techniques may involve performing text recognition on the received image data in order to interpret text that is included as part of the objects detected within the image data. Further, the processing functions may involve assessing the quality of the received image data to determine whether it is of a threshold quality. In this respect, if it is determined that the quality of the received image data is not of a threshold quality, the back-end platform may flag the road segment that was the subject of the received image data for future image collection. The processing functions applied to the received image data by the back-end platform may take other forms as well.

The functionality carried out by image collection pipeline 412 may take various other forms as well.

While the above functionality is described as being carried out by a back-end platform, it should also be understood that the image-capture devices themselves may apply some form of a local collection policy that dictates whether the image-capture devices should "push" their passively-captured image data to the back-end platform. Such a local collection policy may take any of various factors into account, including but not limited to location information for the image-capture device, time information, and the types of objects detected by the image-capture device, among others. Further, in some implementations, both the back-end platform and the image-capture devices could be configured to employ their own respective collection policies that may take various factors into account, which results in a "hybrid" approach for collecting passively-captured image data.

Thus, in summary, image collection pipeline 412 provides a mechanism for intelligently collecting image data for a road network that has been passively captured by image-capture devices traversing the road network, which may in turn enable and facilitate various other "downstream" functionality that is carried out based on image data for a road network.

As one possibility, a map update pipeline (which may be implemented at the same computing platform as the disclosed image collection pipeline or a different computing platform) may utilize the image data collected by the disclosed image collection pipeline to carry out certain functionality related to updating a map. For instance, at a high level, such a map update pipeline may be configured to (i) utilize the image data collected by the disclosed image collection pipeline as a basis for generating certain "map update tasks" that each define a given activity for reviewing and evaluating whether a given aspect of a map should be updated, (ii) optionally prioritize the generated tasks according to some prioritization scheme, (iii) assign the generated (and potentially prioritized) tasks to one or more curators, (iv) interact with each curator (e.g., via a curator's client station) to obtain feedback regarding each curator's assigned tasks, and (v) use feedback from each curator as a basis for updating the map. Additionally, in at least some implementations, the map update pipeline may optionally be configured such that, prior to prioritizing and/or assigning the generated tasks (or at least a subset of the generated tasks) to the one or more curators, the map update pipeline may evaluate whether the generated tasks meet criteria for implementing an automatic map update, and for any generated task that meets such criteria, the map update pipeline may cause the map to be updated automatically based on the generated task as opposed to assigning the task to a curator for review and evaluation.

Figure 5:
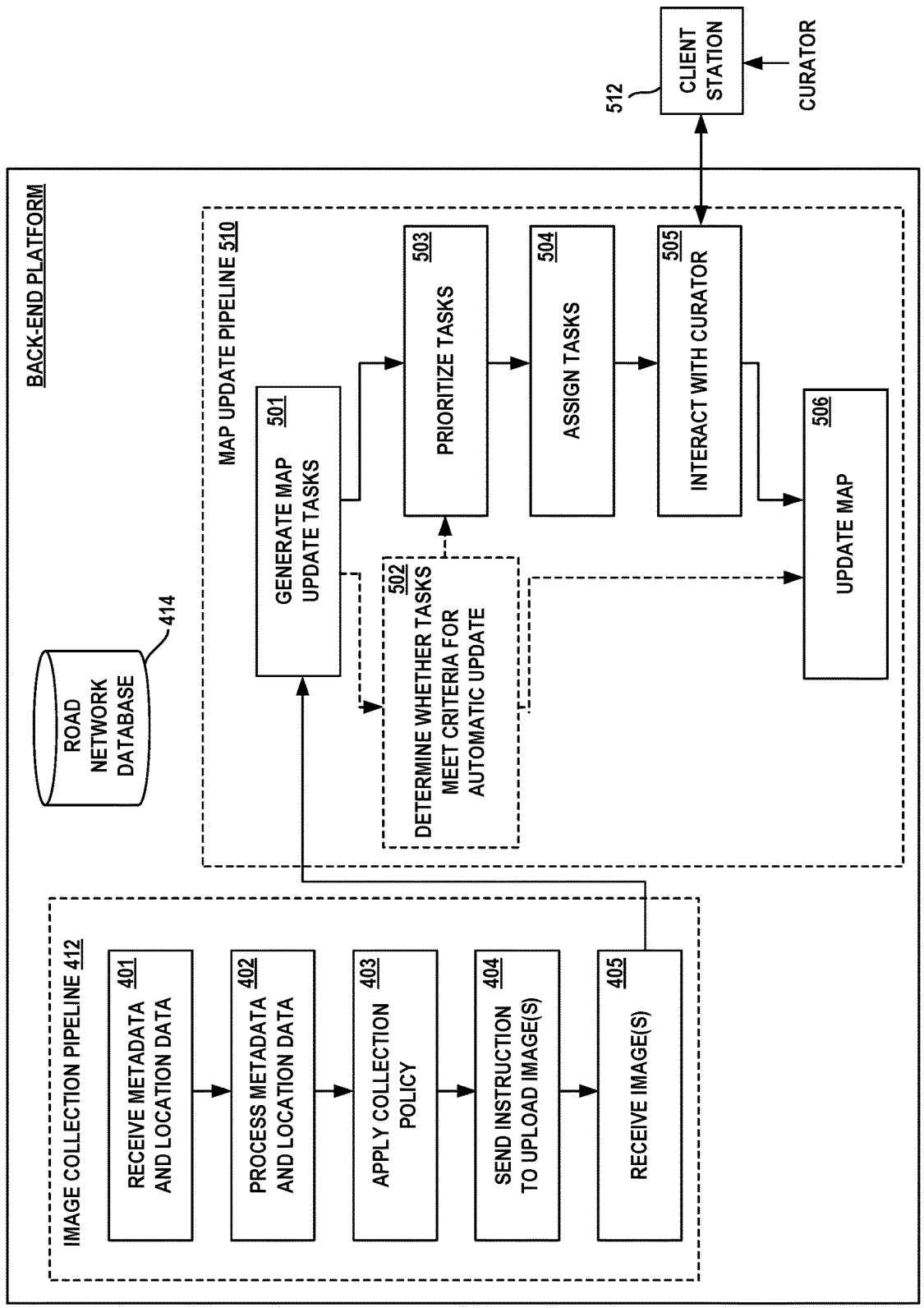
FIG. 5 is a diagram that illustrates one example of a map update pipeline that utilizes data collected by an image collection pipeline to update a map.

Turning to FIG. 5, a block diagram is shown that illustrates some example functions that may be carried out by a map update pipeline 510 that is implemented on the same back-end platform as image collection pipeline 412.

At block 501, map update pipeline 510 may utilize the image data collected by image collection pipeline 412 as a basis for generating map update tasks that each define a given activity for reviewing and evaluating whether a given aspect of a map (e.g., previously-encoded map data for a given location within the map) should be updated. Map update pipeline 510 may generate these map update tasks based on the image data collected by image collection pipeline 412 in various ways.

As one possibility, map update pipeline 510 may be configured generate a new map update task based on each new image that is collected by image collection pipeline 412 (or at least each new image that meets some initial set of criteria for generation of a map update task, such as images that were collected based on a particular factor of the collection policy). As another possibility, map update pipeline 510 may be configured to group newly-collected images together based on road segment (or the like) and then generate a new map update task for each such group of newly-collected images, which may enable a curator to review and evaluate whether map data that should be updated for a given road segment once using multiple images. Map update pipeline 510 may generate the map update tasks based on the image data collected by image collection pipeline 412 in other ways as well.

Further, each generated map update task may include any of various information that may be relevant to a curator (or an automatic update engine) when reviewing and evaluating whether a given aspect of a map should be updated. For instance, as one possibility, a map update task may include data that defines a category (or classification) of the map update task. In this respect, map update pipeline 510 may assign a category to the map update task (e.g., a category that indicates a type of evaluation activity that is to be performed). The category assigned to the map update task may take various forms.

As one example, the category assigned to the map update task may be an "addition" category, which may indicate that the task involves an evaluation of whether to add one or more map elements (e.g., roads or road elements) to existing map data based on a newly-collected image or sequence of images. In this respect, the assigned category may also include an identification of the particular type of map element that is to be reviewed for addition (e.g., missing road, missing lane, missing turn restriction, missing traffic sign or traffic light, etc.).

As another example, the category assigned to the map update task may be a "removal" category, which may indicate that the task involves an evaluation of whether to remove one or more map elements (e.g., roads or road elements) from existing map data based on a newly-collected image or sequence of images. In this respect, the assigned category may also include an identification of the particular type of map element that is to be reviewed for removal (e.g., extraneous road, extraneous lane, extraneous turn restriction, traffic sign or traffic light, etc.).

As yet another example, the category assigned to the map update task may be an "conflict" category, which may indicate that the task involves an evaluation of potential differences between a road element detected in a newly-collected image or sequence of images and a road element present in existing map data in order to decide whether to update that existing map data. In this respect, the assigned category may also include an identification of the particular road element for which there appears to be a conflict (e.g., a traffic sign) and/or the particular nature of the conflict (e.g., conflicting speed limit information).

As still another example, the category assigned to the map update task may be a "verify" category, which may indicate that the task involves an evaluation of a newly-collected image or sequence of images to verify the accuracy of the existing map data. In this respect, to the extent that the verification is focused on certain map elements, the assigned category may also include an identification of a particular type of map element that is to be reviewed for accuracy and verification (e.g., a road, lane, turn restriction, traffic sign or traffic light, etc.).

As yet still another example, the category assigned to the map update task may be a "feedback" category, which may indicate that the task involves gathering feedback to (i) measure and improve the performance of one or more of the pipelines described herein, (ii) cause the collection of image data for one or more road segments, and/or (iii) evaluate diagnostics of the map update task itself.

Further, it should be understood that multiple categories may be assigned to the map update task. In this respect, a given map update task may be assigned the "addition" category as well as the "removal" category The category assigned to the map update task may take other forms as well.

As another possibility, a map update task may include data indicating a particular portion of the map data should be reviewed and evaluated as part of the task. This data may take various forms. As one example, this data may include an indication of which particular location or area within the map is to be evaluated, which could take the form of a set of coordinates, an identifier of a given road segment, or some other indication of an area or location within the map. As another example, this data may include a link or pointer to the particular portion of the map data that should be reviewed and evaluated as part of the task. Other examples are possible as well.

As yet another possibility, a map update task may include a copy of (or link to) at least one newly-collected image that formed the basis for the map update task.

As still another possibility, a map update task may include other data about the newly-collected image(s) that form the basis for the map update task. This data may take various forms, examples of which may include data that is derived based on the passively-captured images (e.g., data that provides information about the objects detected in the newly-collected image(s) and/or data that provides information as to the reason why such image(s) were selected for collection, among other possibilities. In this respect, the data that is derived based on the passively-captured images may comprise data that has been generated by the image-capture devices and provided to the back-end platform as part of the image-capture metadata and/or may comprise data that has been generated by the back-end platform (e.g., either as part of processing the images after collection or as part of generating the task).

The map update task may include various other types of data as well.

At block 502, map update pipeline 510 may optionally determine whether one or more generated map update tasks meet given criteria for implementing a map update automatically. In this respect, for any generated map update task that meets the given criteria for implementing a map update automatically, map update pipeline 510 may implement a map update automatically based on that task. Conversely, for any generated map update task that does not meet the given criteria for implementing a map update automatically, map update pipeline 510 may determine that the task should be reviewed by a curator and then proceed to prioritize and assign the task for curation.

In general, the criteria that is used to determine whether to implement a map update automatically may comprise any criteria that enables map update pipeline 510 to determine that a particular map update is necessary with a high level of confidence, such that it is deemed unnecessary to present the map update task to a curator for review. This criteria could be based on various factors, examples of which may include a type of map update that is under evaluation (e.g., addition of a map element, removal of a map element), a location of the map update under evaluation, a type of map element that is the subject of the map update under evaluation, confidence score information for objects present in one or both of the newly-collected image(s) and the existing map data, and the map layer implicated by the map update task (e.g., if the map update task relates to the addition of a construction zone to a map, which may only implicate the visualization of the map and thus may be suitable for an automatic map update), among various other possible factors.

In one implementation, after the map update tasks are generated, map update pipeline 510 may use a first-in-first-out (FIFO) type of mechanism to maintain and order such map update tasks for assignment to curators, where the newly-generated map update tasks are simply ordered for assignment to curators in the same order they are generated. For instance, each map update task that is generated by map update pipeline 510 may be added to a FIFO queue (or the like). In turn, map update pipeline 510 may assign each map update task for completion in the order it was added to the queue.

In this implementation, map update pipeline 510 could utilize (i) one single FIFO queue that contains all generated map update tasks or (ii) a plurality of different FIFO queues that are associated with different categories of map update tasks (which could be based on the same task categories discussed above or some other categorization framework). For instance, the map update pipeline 510 may utilize a single FIFO queue in implementations where the map update tasks being generated are to be assigned to one global pool of curators, whereas map update pipeline 510 may utilize a plurality of different FIFO queues where it would be advantageous to assign different categories of map update tasks being generated to different pools of curators. For instance, if a first pool of curators specializes in completing map update tasks related to evaluating whether to add, remove, or update turn restrictions and a second pool of curators specializes in completing map update tasks related to evaluating whether there are missing roads need to be added, it may be beneficial to utilize a first FIFO queue that contains map update tasks related to evaluating whether to add, remove, or update turn restrictions, which may be used to assign tasks to the first pool of curators, and to utilize a second FIFO queue that contains map update tasks related to evaluating whether there are missing roads need to be added, which may be used to assign tasks to the second pool of curators. In this way, curators can be assigned the category of map update tasks for which they are most skilled.

When map update pipeline 510 utilizes a single FIFO queue for all map update tasks, there will be one single, linear ordering of the tasks that spans all of the different categories of map update tasks. For example, if a map update task related to a turn restriction was added to the FIFO queue prior to a map update task related to the name of a road, the map update task related to the turn restriction would be assigned to a curator for completion before the map update task related to the name of the road.

Alternatively, when map update pipeline 510 utilizes a plurality of FIFO queues for different categories of map update tasks, the map update tasks may be separated out into different FIFO queues based on their categories, and the map update tasks within each FIFO queue may be ordered based on the order in which they were generated. When the map update tasks in each FIFO queue are organized in this way, map update pipeline 510 can separately manage the FIFO queues, such as by assigning different categories of map update tasks to different pools of curators.

Using a FIFO approach such as this to organize and order map update tasks for assignment to curators may be sufficient in certain scenarios where there the number of map update tasks being generated does not substantially outpace the number of map update tasks that can be reviewed by available curators and/or the map update tasks being generated have a relatively similar level of priority such that there is not a significant need to reorder the tasks prior to assignment. However, there are many other scenarios where the number of map update tasks being generated may substantially outpace the number of map update tasks that can possibly be completed by available curators and/or the map update tasks being generated are generally viewed to have varying different levels of priority. In these scenarios, a FIFO approach is unlikely to be sufficient, as such an approach will most likely result in a fast-growing backlog of map update tasks where newly-generated map update tasks will have little or no chance of being completed in a timely manner, regardless of how the priority level of those newly-generated map update tasks compares to the priority level of previously-generated map update tasks.

Accordingly, in a least some scenarios, there may be a need to intelligently prioritize the map update tasks being generated by map update pipeline 510 such that newly-generated map update tasks considered to have a higher priority (e.g., a map update task considered to be more critical, urgent, and/or impactful to consumers of the map regardless of when the map update task was generated) will be assigned to curators for completion before previously-generated tasks that are considered to have a lower priority (e.g., a map update task considered to be less critical, urgent, and/or impactful to consumers of the map). For instance, a map update task that involves updating a road name may be considered to have a higher priority than a map update task that involves adding a crosswalk sign to the map because an incorrect road name may cause more problems when using the map for directions or the like, and as such, the map update task that involves updating a road name may be considered to be more impactful than assigning the map update task that involves removing a stop sign from the map (e.g., from a business and/or safety perspective). As such, it would be desirable to assign the map update task that involves updating a road name to a curator for completion before assigning the map update task that involves adding a crosswalk sign to the map to a curator for completion regardless of the generation time of these tasks.

To address these needs, at block 503, map update pipeline 510 may optionally prioritize the generated map update tasks according to some prioritization scheme that is based on information beyond generation time. Such a prioritization scheme may take any of various possible factors into account in order to prioritize the generated map update tasks for assignment to the one or more curators.

A first possible factor that could be used by the prioritization scheme is an importance of the road segments that are the subject of the map update tasks, where map update tasks involving road segments deemed to have a greater level of importance may be considered to have a higher priority than map update tasks involving road segments deemed to have a lesser level of importance. In this respect, the importance of a road segment may be determined based on any of various types of available information, examples of which include (i) the number of times a vehicle traverses the road segment over a period of time, (ii) the type of road (e.g., highway, city street, service street, etc.), and/or (iii) the location of the road segment (e.g., urban area, rural area, etc.), among other possibilities.

A second possible factor that could be used by the prioritization scheme is the types of map elements implicated by the map update tasks, where map update tasks involving certain types of map elements may be considered to have a higher priority than map update tasks involving other types of map elements. In this respect, the types of map elements that may impact the prioritization of the map update tasks may take various forms, examples of which include road elements such as stop signs, crosswalks, traffic signals, speed limit signs, lane markings, and road markings, among others, as well as other kinds of map elements such as missing roads, etc., and the manner in which the different types of map elements are prioritized relative to one another could take any of various forms depending on the prioritization scheme employed.

A third possible factor that could be used by the prioritization scheme is a predicted likelihood that the map update tasks are going to result in actual map updates (which may also be referred to as "true positive" likelihood or "solvability"), where map update tasks that have a higher likelihood of resulting in a map update may be considered to have a higher priority than map update tasks that have a lower likelihood of resulting in a map update. In this respect, the predicted likelihood that a map update task is going to result in an actual map update may be determined based on various information, examples of which include a type of map update that is the subject of the task (e.g., addition of a map element, removal of a map element), a location of the map update that is the subject of the task, a type of map element that is the subject of the map update under evaluation, confidence score information for objects present in one or both of the newly-collected image(s) and the existing map data, and/or other information about the newly-collected image(s), among various other possible factors.

A fourth possible factor that could be used by the prioritization scheme is an expected time for completion of the map update tasks, where map update tasks that have lower expected completion time may be considered to have a higher priority than map update tasks that have a higher expected completion time (or perhaps vice versa depending on the implementation). In this respect, the expected time for completion of a map update task may be determined based on any of various types of available information, examples of which include a type of map update that is the subject of the task (e.g., addition of a map element, removal of a map element), a location of the map update that is the subject of the task, a type of map element that is the subject of the map update under evaluation, confidence score information for objects present in one or both of the newly-collected image(s) and the existing map data, and/or other information about the newly-collected image(s), among various other possible factors.

A fifth possible factor that could be used by the prioritization scheme is whether there are any relevant deadlines governing completion of the map update tasks, where map update tasks that have approaching deadlines may be considered to have a higher priority than map update tasks that do not have approaching deadlines. In this respect, the relevant deadlines governing completion of the map update tasks may take various forms. As one possibility, a relevant deadline for a map update task may take the form of a specific date and time by which the map update task needs to be completed, which could be defined based on a Service Level Agreement (SLA) or the like that specifies a particular turnaround time for completion of certain types of map update tasks (e.g., 24 hours after the map update task is generated) or could be defined based on some other timing requirement for completion of the particular map update task (e.g., based on an internal schedule or the like). As another possibility, a relevant deadline for a map update task may be defined based on a quota that does not specify a particular date and time of completion for the map update task itself, but rather specifies that a certain number of map update tasks of a given type have to be completed within a certain timeframe (e.g., a certain number of tasks per day). The relevant deadlines governing completion of the map update tasks may take other forms as well.

A sixth possible factor that could be used by the prioritization scheme is the categories of the map update tasks, where certain categories of map update tasks may be considered to have a higher priority than other categories of map update tasks.

A seventh possible factor that could be used by the prioritization scheme is the impact of the map update tasks (e.g., from a business and/or safety perspective). In this respect, a map update task that involves updating a road name may be considered to be more impactful, and thus have a higher priority, than a map update task that involves removing a stop sign from the map.

The prioritization scheme applied by map update pipeline 510 may take various other factors into account as well.

A given prioritization scheme may be defined to take any one or more of these possible factors into account when prioritizing the generated map update tasks, which may be referred to as the one of more "factors of interest" for the given prioritization scheme, and the particular manner in which the one or more factors of interest are used by map update pipeline 510 when applying the prioritization scheme may take various forms.

In one implementation, for instance, the prioritization scheme applied by map update pipeline 510 may comprise a scheme that only uses one factor of interest to prioritize the map update tasks. For example, if a prioritization scheme is defined to use only road segment importance for prioritizing map update tasks, then that scheme may be configured to order the map update tasks for assignment based solely on the importance of the road segment that is the subject of each such map update task.

In another implementation, the prioritization scheme applied by map update pipeline 510 may comprise a scheme that uses multiple factors of interest to prioritize the map update tasks. In such an implementation, map update pipeline 510 may be configured to (i) use the multiple different factors to determine a respective priority value for each map update task and then (ii) use the respective priority values that are determined for the map update tasks to order the map update tasks for assignment to curators.

Map update pipeline 510 may determine a respective priority value for each map update task in various ways. As one possibility, map update pipeline 510 may determine a respective priority value for a given map update task by first assigning the given map update task a factor-specific value for each factor of interest, which could take any of various different forms depending on the factor. For instance, for some factors, the factor-specific value may be a binary value such as 0 or 1. One representative example of such a factor may include whether there is any relevant deadline governing completion of a map task update. However, it should be understood that this factor could alternatively or additionally be expressed in terms of a categorical and/or numerical value as well (e.g., a categorical or numerical value that quantifies the urgency of a deadline to the extent one exists), and that at least some of the other factors discussed herein could also be expressed in terms of binary values instead of (or in addition to) being expressed in terms of categorical and/or numerical values.

For other factors, the factor-specific value may be a categorical value that is selected from a predefined set of possible numerical values that can quantify the factor, such as a predefined scale of numerical values (e.g., a scale ranging from 1 to 10). Representative examples of such factors may include road segment importance, type of map element, likelihood of a map update task resulting in a map update, task category, among other possibilities. However, it should be understood that these factors could alternatively or additionally be expressed in terms of binary and/or numerical values as well, and that at least some of the other factors discussed herein could also be expressed in terms of categorical values instead of (or in addition to) being expressed in terms of binary and/or numerical values.

For still other factors, the factor-specific value may be a continuous value that provides a meaningful way to quantify the factor. One representative example of such a factor may include expected time to complete a map update task, which may be expressed in terms of some numerical measure of how much time it is expected to take to complete the map update task. However, it should be understood that this factor could alternatively or additionally be expressed in terms of a binary and/or categorical value as well, and that at least some of the other factors discussed herein could also be expressed in terms of numerical values instead of (or in addition to) being expressed in terms of binary and/or categorical values.

The factor-specific value that is assigned to the given map update task for each factor of interest may take other forms as well.

After map update pipeline 510 determines the factor-specific values for the given map update task, map update pipeline 510 may then use these factor-specific values to determine a priority value for the given map update task in any of various manners, examples of which may involve combining the factor-specific values together using mathematical operations or perhaps also weighting certain of the factor-specific values, among other possibilities.

Map update pipeline 510 may determine the respective priority values for the generated map update tasks in various other ways as well.

Map update pipeline 510 map may then use the respective priority values that are determined for the map update tasks to order the map update tasks for assignment to curators. Map update pipeline 510 may perform this function in various ways.

In one implementation, map update pipeline 510 may utilize one or more queues to maintain and order the map update tasks that are to be assigned to the one or more curators, where the map update tasks in each of the one or more queues are ordered (or at least can be ranked) based on their priority values and map update pipeline 510 assigns the map update tasks having the highest priority values out of the each of the one or more queues.

For instance, as one possibility, map update pipeline 510 may utilize one single "global" queue to maintain all generated map update tasks that are to be assigned to the one or more curators, where the map update tasks in this global queue are ordered based on their priority values. In this respect, each respective map update task that is generated by map update pipeline 510 may be inserted into the global queue at a position within the queue's order that corresponds to the priority value assigned to the respective map update task. To illustrate with a simple example, if the priority values that can be assigned to the generated map update tasks range from 1 on the low end to 100 on the high end, and a newly-generated map update task is assigned a priority value of 90, map update pipeline 510 may insert the newly-generated map update task into the global queue at a position that corresponds to this priority value of 90—which puts the newly-generated map update task closer to the "top" of the global queue for purposes of assigning tasks out of the queue to the one or more curators.

As another possibility, map update pipeline 510 could utilize a plurality of different queues that are associated with different categories of map update tasks (which could be based on the same task categories discussed above or some other categorization framework) to maintain the map update tasks that are to be assigned to the one or more curators, where the respective set of map update tasks in each of the queues are ordered based on their priority values. In this respect, for each respective map update tasks that is generated by map update pipeline 510, map update pipeline 510 may function to (i) use respective map update task's category as a basis for selecting the particular queue where the respective map update task is to be inserted, and then (ii) insert the respective map update into the selected queue at a position within the selected queue's order that corresponds to the priority value assigned to the respective map update task. In line with the discussion above, such an approach may be beneficial in a scenario where there is desire to separate the management and assignment of different categories of map update tasks (e.g., for purposes of assigning different categories of map update tasks to different pools of curators).

In another implementation, map update pipeline 510 may utilize one or more queues to maintain and order the map update tasks that are to be assigned to the one or more curators, where some of the map update tasks are ordered for assignment based on their priority values but other map update tasks are ordered for assignment based on some other parameter.

For instance, as one possibility, map update pipeline 510 may utilize one single "global" queue to maintain all generated map update tasks that are to be assigned to the one or more curators, but may utilize a multi-tiered approach for ordering the map update tasks within that global queue in which the map update tasks are (i) first ordered according to which "tier" they belong to (e.g., first priority tier, second priority tier, etc.), which may be determined based on the tasks' factor-specific values for one or more factors of interest, and then (ii) within each tier, the map update tasks are ordered based either on the tasks' respective priority values or the tasks' factor-specific values for one or more factors associated with the tier. For example, one such multi-tier approach may involve first ordering the map update tasks into tiers based on whether the map update tasks are governed by a deadline, where all of the map update tasks having an approaching deadline are placed in a first tier having a higher priority and all of the map update tasks that are not governed by an approaching deadline are placed in a second tier having a lower priority—such that every task in the first tier is ordered ahead of any task in the second tier. In turn, the map update tasks in the first tier may be ordered based either on their respective priority values or on factor-specific values indicating the urgency of the tasks' approaching deadlines, while the map update tasks in the second tier may be ordered based on their respective priority values. The result may be a queue of map update tasks that will result in the completion of any map update tasks governed by approaching deadlines prior to completion of any map update tasks that are not governed by any approaching deadlines. Map update pipeline 510 utilize various other examples of multi-tiered approaches as well.

Along similar lines, as another possibility, map update pipeline 510 could utilize a plurality of different queues that are keyed to different "tiers" of map update tasks in order to maintain and order the map update tasks that are to be assigned to the one or more curators. For instance, map update pipeline 510 could utilize a first queue (or perhaps a first set of queues) to maintain and order map update tasks considered to be in a first tier, such as map update tasks having approaching deadlines (e.g., deadlines defined based on SLAs, quotas, or the like), a second queue (or perhaps a second set of queues) to maintain and order map update tasks considered to be in a second tier, such as map update tasks that do have approaching deadlines, and so on. In this respect, for each respective map update tasks that is generated by map update pipeline 510, map update pipeline 510 may function to (i) determine the tier to which the respective map update task belongs based on the task's factor-specific values for one or more factors of interest, (ii) select a queue that corresponds to the determined tier of the respective map update task, and then (iii) insert the respective map update into the selected queue at a position within the selected queue's order that corresponds to either the task's respective priority value or some other factor-specific value (e.g., urgency of an approaching deadline for the task). In turn, map update pipeline 510 may function to give a higher priority to the queues associated with certain tiers over others when assigning the map update tasks to curators. For example, map update pipeline 510 may function to assign out every map update task in a first-tier queue before assigning any map update task in a second-tier queue, among various other possibilities.

Map update pipeline 510 could also utilize various other mechanisms to maintain and order the map update tasks for assignment to curators based on their respective priority values and/or certain factor-specific values.

Further, map update pipeline 510 may carry out these prioritization functions at various times during the course of generating the map update tasks. For instance, as one possibility, map update pipeline 510 may prioritize map update tasks as they are generated. In this respect, as each map update task is generated, map update pipeline 510 may determine a respective priority value for the generated task and then use the respective priority value (and/or other factor-specific values) to insert the generated task into an existing queue of yet-to-be-assigned map update tasks.

As another possibility, map update pipeline 510 may prioritize generated map update tasks in batches in response to detecting certain triggers, which may take various forms. One possible example of such a trigger may comprise a determination by map update pipeline 510 that a threshold number of new map update tasks have been generated since the last prioritization of new map update tasks. Another possible example of such a trigger may comprise a determination by map update pipeline 510 that a threshold amount of time has passed since the last prioritization of new map update tasks. Other examples of triggers that may cause map update pipeline 510 to prioritize a new batch of generated map update tasks are possible as well. In response to detecting such a trigger, map update pipeline 510 may then function to (i) determine a respective priority value for each of the map update tasks that has been generated since the last prioritization was carried out (unless such priority values were previously determined as part of generating the task) and (ii) use the respective priority values for these tasks in the new batch to insert such tasks into the one or more queues of yet-to-be-assigned map update tasks.

In yet another implementation, map update pipeline 510 may prioritize map update tasks in batches according to a schedule that may define a set of future times at which map update pipeline 510 is to prioritize the map update tasks. For example, when one of these future times is reached, map update pipeline 510 may function (i) determine a respective priority value for each of the map update tasks that has been generated since the last prioritization was carried out (unless such priority values were previously determined as part of generating the task) and (ii) use the respective priority values for these task in the new batch to insert such tasks into the one or more queues of yet-to-be-assigned map update tasks.

The prioritization method may prioritize map update tasks at other times and in other manners as well.

Turning back to FIG. 5, at block 504, map update pipeline 510 may assign map update tasks to one or more curators for review in accordance with the prioritization of such map update tasks (e.g., by assigning the map update tasks having the highest priority out of each of the one or more queues). Map update pipeline 510 may assign the map update tasks in various ways.

Under one possible approach for assigning map update tasks, map update pipeline 510 may assign a set of one or more pending map update tasks to a given curator in response to detecting that the given curator is available to take on newly-assigned map update tasks (e.g., after the given curator has completed some or all of her previously-assigned map update tasks). In accordance with this approach, when map update pipeline 510 detects that the given curator is available to take on newly-assigned map update tasks, map update pipeline 510 may generally function to (i) select the particular queue(s) of map update tasks from which to assign the one or more tasks to the given curator and then (ii) assign the given curator whichever one or more map update tasks in the selected queue(s) currently have the highest priority (e.g., the one or more map update tasks that are at the "top" of the queue). In this respect, the function of selecting the particular queue(s) of map update tasks from which to assign the one or more tasks to the given curator may take various forms.

As one possibility, if map update pipeline 510 is only utilizing a single global queue to maintain all map update tasks, then the function of selecting the particular queue(s) of map update tasks from which to assign the one or more tasks to the given curator may simply comprise selecting that one global queue.

As another possibility, if map update pipeline 510 is utilizing a plurality of different queues to maintain map update tasks from different categories, then the function of selecting the particular queue(s) of map update tasks from which to assign the one or more tasks to the given curator may involve a determination of which of these different category-specific queues should be used for the assignment to the given curator. Such a determination may be based on various factors. As one possible factor, the map update pipeline's determination of which of these different category-specific queues should be used for the assignment to the given curator may be based on certain information about the given curator, such as an experience level of the given curator and/or a recognized set of skills and/or specializations of the given curator, among other possibilities. For example, if the map update tasks are maintained in different queues that are keyed to different categories of potential map updates (e.g., a first queue for map update tasks related to missing roads, a second queue for map update tasks related to lane counts, a third queue for map update tasks related to turn restrictions, etc.) and the given curator has a recognized set of skills and/or specializations that matches up with a particular one of these different categories, then map update pipeline 510 may then select the queue keyed to that one category as the queue from which to assign the one or more tasks to the given curator.

To facilitate this functionality, each available curator may have an associated profile that contains information about the curator, which may take various forms and include information such as (i) an identification of the curator, (ii) the curator's availability to complete map update tasks, (iii) the curator's experience level, and/or (iv) a recognized set of skills and/or specializations of the curator if any exist (e.g., particular map update tasks the curator is more efficient at completing). A curator's profile may take other forms as well.

The map update pipeline's determination of which of the different category-specific queues should be used for the assignment to the given curator may be based on various other factors as well.

As yet another possibility, if map update pipeline 510 is utilizing a plurality of different queues to maintain map update tasks that have been organized into different "tiers," then the function of selecting the particular queue(s) of map update tasks from which to assign the one or more tasks to the given curator may involve selecting whichever queue is associated with the highest tier unless that queue is empty, in which case the queue associated with the next-highest tier is selected. For example, if the map update tasks are maintained in different queues that are keyed to two different tiers—a higher tier associated with tasks having approaching deadlines and a lower tier for all other tasks—then map update pipeline 510 may either (i) select the queue keyed to the higher tier if it contains pending map update tasks that need to be assigned or (ii) select the queue keyed to the lower tier if the queue keyed to the higher tier is empty (or at least does not have a sufficient number of pending tasks for assignment).

The function of selecting the particular queue(s) of map update tasks from which to assign the one or more tasks to the given curator may take other forms as well.

As noted above, after selecting the particular queue(s) of map update tasks from which to assign the one or more tasks to the given curator, map update pipeline 510 may then assign the given curator whichever one or more map update tasks in the selected queue(s) currently have the highest priority (e.g., the one or more map update tasks that are at the "top" of the queue). For example, if map update pipeline 510 is configured to assign the given curator 10 new map update tasks during each assignment, map update pipeline 510 may determine which 10 map update tasks in the selected queue are considered to have the highest priority (e.g., based on the ordering of the queue and/or the assigned priority values) and then assign those 10 map update tasks to the given curator. Of course, this example assignment of 10 map update tasks has merely been described for purposes of illustration, and it should be understood that map update pipeline 510 may assign any number of map update tasks to the given curator during any given assignment operation. Further, it should be understood that map update pipeline 510 could assign map update tasks from multiple different queues to the given curator (e.g., in a scenario where the first-selected queue only contains a smaller number of map update tasks and map update pipeline 510 is configured to assign more than that number of map update tasks to the given curator).

Under another possible approach for assigning map update tasks, map update pipeline 510 may assign pending map update tasks to curators in accordance with some trigger other than curator availability. Such a trigger may take various forms, examples of which may include (i) a determination that a threshold number of map update tasks are currently pending and are ready to be assigned or (ii) a determination that a threshold amount of time has passed since the last assignment of map update tasks to curators, among others. In accordance with this approach, when map update pipeline 510 detects such a trigger, map update pipeline 510 may identify which one or more curators are to receive a new assignment of map update tasks (and perhaps also determine the number of map update tasks to be assigned to each such curator), and then for each respective curator that is identified, may function to (i) select the particular queue(s) of map update tasks from which to assign one or more tasks to the respective curator (e.g., in a manner similar to that described above) and then (ii) assign the respective curator whichever one or more map update tasks in the selected queue(s) currently have the highest priority (e.g., the one or more map update tasks that are at the "top" of the queue). Map update pipeline 510 may assign map update tasks based on such a trigger in other manners as well.

Under another possible approach for assigning map update tasks, map update pipeline 510 may assign pending map update tasks to curators in accordance with a schedule (e.g., a schedule defining one or more particular times each day when an assignment operation is to be carried out). In accordance with this approach, each time that a scheduled assignment operation is to be carried out, map update pipeline 510 may identify which one or more curators are to receive a new assignment of map update tasks during that assignment operation (and perhaps also determine the number of map update tasks to be assigned to each such curator), and then for each respective curator that is identified, may function to (i) select the particular queue(s) of map update tasks from which to assign one or more tasks to the respective curator (e.g., in a manner similar to that described above) and then (ii) assign the respective curator whichever one or more map update tasks in the selected queue(s) currently have the highest priority (e.g., the one or more map update tasks that are at the "top" of the queue). Map update pipeline 510 may assign map update tasks based on such a schedule in other manners as well.

Map update pipeline 510 may employ other approaches for assigning map update tasks to curators as well.

At block 505, after map update pipeline 510 assigns a new set of one or more map update tasks to a curator, map update pipeline 510 may interact with the curator (e.g., via the curator's client station) in order to obtain the curator's feedback regarding the assigned set of one or more map update tasks. In practice, this interaction may involve communication between the back-end platform and a client station that is associated with the curator, one example of which is client station 512.

Client station 512 may generally comprise any computing device that is configured to facilitate interaction between the curator and map update pipeline 510 of the back-end platform. For instance, client station 512 may take the form of a smartphone, a tablet, a desktop computer, a laptop, a netbook, and/or a PDA, among other possibilities. Further, in at least some embodiments, client station 512 may comprise an I/O interface, a communication interface, at least one processor, data storage, and executable program instructions for facilitating interaction between the curator and back-end platform (which may be embodied in the form of a software application, such as a mobile application, web application, or the like).

The interaction that may take place between the back-end platform and the curator's client station may take any of various forms. As some representative examples, such interaction may include (i) the back-end platform sending a communication to client station 512 to notify the curator that the assigned set of one or more map update task is ready for review and completion, (ii) back-end platform transmitting the assigned set of one or more map update tasks to client station 512, (iii) the back-end platform causing client station 512 to display an interface for the curator to review and complete the assigned set of one or more map update tasks, and (iv) client station 512 receiving user input from the curator related to the assigned set of one or more map update tasks and then transmitting data defining that user input to the back-end platform, among other possibilities.

The interface that is presented to the curator—and the user input that client station 512 may receive from the curator via that interface—may take any of various forms, which may depend in part on the nature of the map update tasks. As one example to illustrate, if the map update task is to review the speed limit of a given road segment that was previously encoded into the map to determine whether it should be updated, client station 512 may present the curator with an interface that facilitates the review and potentially updating of the speed limit through one or more user interface elements (e.g., check boxes, drop down menus, etc.). In turn, the curator may interact with the one or more user interface elements to provide feedback regarding the speed limit and then provide an indication that the map update task is completed. After the curator completes the map update task, client station 512 may send data to the back-end platform that includes data defining the curator's feedback related to the map update task as well as an indication that the map update task is complete.

At block 506, map update pipeline 510 may use the curator feedback that is received for each completed map update task to potentially implement a map update. This function may be carried out in various ways. As one possible example to illustrate, if the map update task was a task for a curator to review and evaluate whether a turn restriction should be added to a given road segment and the curator provided feedback indicating that the turn restriction should be added to the given road segment, map update pipeline 510 may update the map data to add the turn restriction in the given road segment. Many other examples are possible.

In some implementations, the curator feedback may also indicate that additional image data is needed to implement a map update. In such implementations, map update pipeline 510 may interact with image collection pipeline 412 in order to cause the collection of additional image data for a given road segment. Map update pipeline 510 may interact with image collection pipeline 412 (i) directly by sending a communication directly to image collection pipeline 412 that requests collection of image data for the given road segment, to the extent that such image data is passively captured by image-captured devices, or (ii) indirectly by updating the road-network data in road-network database 414 to reflect that new image data should be collected for the given road segment, among other possibilities.

After a map update is implemented, the updated map data for the map may then be provided to any of various consumers of the map, which may take various forms depending on the nature of the map and the manner in which it is being used. As one possible example, the updated map may be provided to an operator of a rideshare platform or other transportation-matching platform, which may then use the updated map for various purposes (e.g., matching riders with vehicles, routing, determining ETAs, pre-positioning vehicles, generating user visualizations, etc.). As another possible example, the updated map may be provided to an operator of another type of platform that utilizes the map to deliver a software application to end users. Many other examples are possible as well.

As noted above, the map update pipeline described above is just one possible example of downstream functionality that could be carried out based on image data for a road network that is collected by the disclosed image collection pipeline, and the disclosed image collection pipeline may enable and facilitate various other downstream functionality as well.

As another possibility, a map evaluation pipeline (which may be implemented at the same computing platform as the disclosed image collection pipeline or a different computing platform) may interface with the disclosed image collection pipeline (either directly or indirectly) in order to cause the image collection pipeline to collect image data for certain road segments and then utilize the image data collected by the disclosed image collection pipeline to carry out certain functionality related to evaluating a map. For instance, at a high level, such a map evaluation pipeline may be configured to (i) employ a sampling mechanism to select road segments within a road network that are to be used for map evaluation, (ii) cause the disclosed image collection pipeline to collect image data that is passively captured for the selected road segments, which may in turn be provided to the map evaluation pipeline, (iii) utilize the image data that was collected for the selected road segments during some window of time (which will typically only cover a subset of the total set of selected road segments given the passive nature of the image capture) as a basis for generating "map evaluation tasks" that each define a task for evaluating the accuracy of previously-encoded map data for a given road segment, (iv) assign the generated tasks to one or more curators for evaluation, (v) interact with the one or more curators (e.g., via a curator's client station) to obtain feedback regarding the assigned tasks, and (vi) derive one or more accuracy metrics based on the feedback from the one or more curators.

Figure 6:
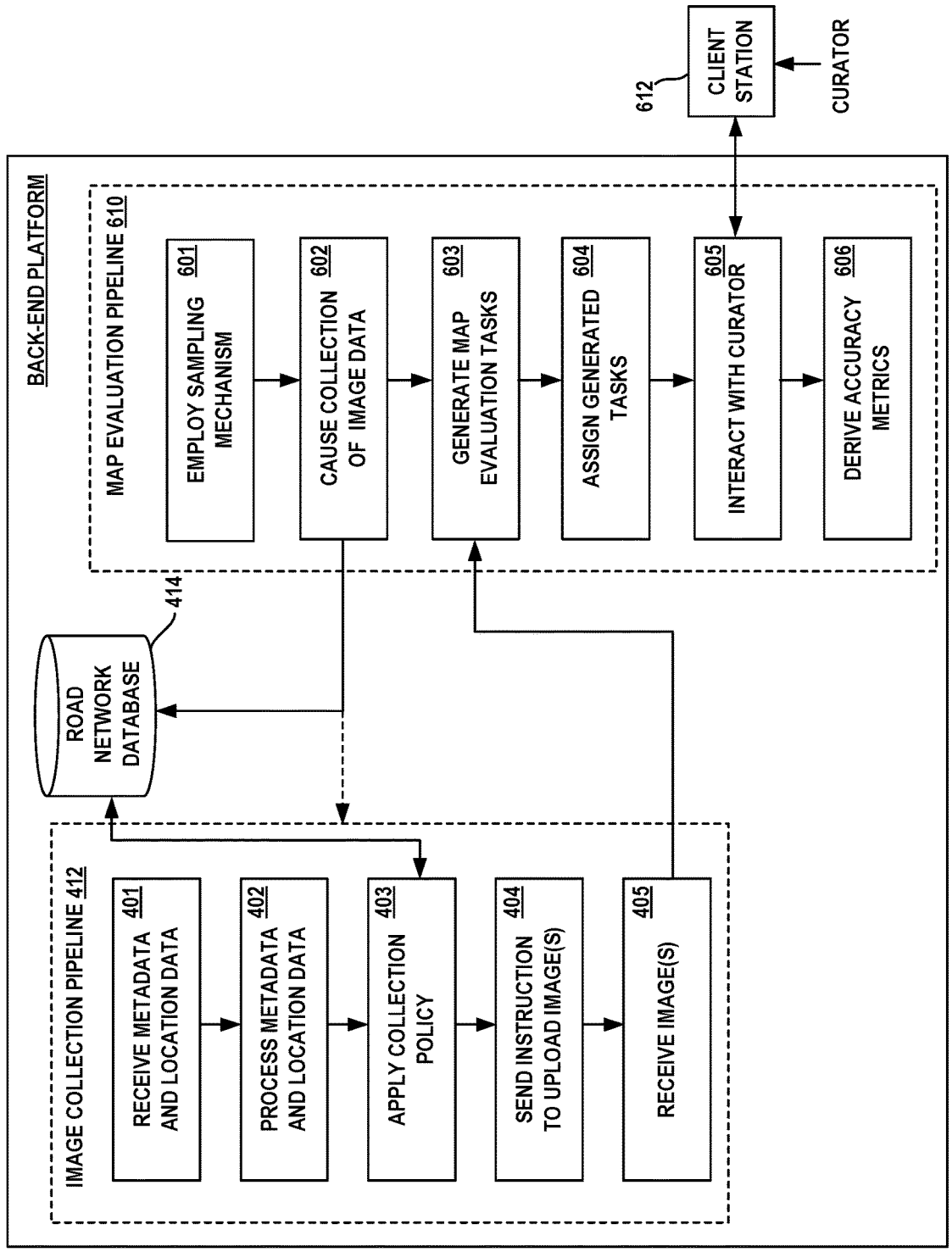
FIG. 6 is a diagram that illustrates one example of a map evaluation pipeline that utilizes data collected by an image collection pipeline to evaluate a map.

Turning to FIG. 6, a block diagram is shown that illustrates some example functions that may be carried out by a map evaluation pipeline 610 that is implemented on the same back-end platform as image collection pipeline 412.

At block 601, map evaluation pipeline 610 may employ a sampling mechanism to select a universe of road segments within a road network that are to be used for map evaluation. In this respect, the goal of the sampling mechanism is to select the universe of road segments for which to "unlock" collection of image data that is passively captured by the image-capture devices, so that as image data is passively captured for the selected road segments, that image data will be collected by image collection pipeline 410. Given the passive nature of the image capture, this may then result in image data being collected for some random subset of the selected road segments over the course of some window of time, and this collected image data may then be utilized by map evaluation pipeline 610 to facilitate evaluation of map accuracy as described in further detail below. The sampling mechanism employed by map evaluation pipeline 610 to achieve this goal may take various forms.

In one implementation, the sampling mechanism employed by map evaluation pipeline 610 may first involve dividing up the road segments in the road network into a number of discrete groups (or "bins") of road segments to use for the sampling. In this respect, the sampling mechanism could use any of various guiding principles to define the groups of road segments to use for the sampling. As one possibility, the guiding principle used by the sampling mechanism may be to divide the road segments into a number of discrete groups where the total usage of the road segments in each such group is approximately the same. Under such an approach, the usage of each road segment could be defined in terms of the number of times the road segment has been traversed by an image-capture device during a given window of time or distance driven on the road segment during the given window of time, among other possibilities.

One way to accomplish this type of grouping of road segments may be to sort the list of road segments in the road network based on usage, and then divide up the sorted list of road segments into a certain number of bins that each have approximately the same amount of total usage. As a result of this approach, each group of road segments may have the same total amount of usage, but the number of road segments in each group will differ. For instance, the group that contains the road segments having the highest individual usage values (e.g., highways or the like) will have the lowest total number of road segment, whereas the group that contains the road segments having the lowest individual usage values (e.g., roads in more remote areas) will have the highest total number of road segment.

This approach of defining groups of road segments that have approximately the same amount of total road usage may be beneficial in that it enables the sampling mechanism to identify more representative samples of road segments. For instance, if the road segments were not grouped in this manner before sampling, road segments with higher usage may be sampled at the same rate as road segments with lower usage, which could potentially result in under sampling for the higher usage roads.

Map evaluation pipeline 610 may define the groups of road segments to use for the sampling in other manners as well.

After defining the groups of road segments to use for the sampling, the sampling mechanism employed by map evaluation pipeline 610 may involve selecting a random sampling of road segments from each group of road segments. In this respect, the guiding principle for the random sampling may be to select approximately the same percentage of road segments from each group. As one example to illustrate, if the lowest-usage group of road segments contains 80,000 road segments and the highest-usage group of road segments contains 1,000 road segments, and the sampling mechanism defines a sampling percentage of 10% per group, then map evaluation pipeline 610 may select approximately 8,000 randomly-sampled road segments from the lowest-usage group and approximately 100 randomly-sampled road segments from the high-usage group. The road segments that are selected in this manner across all of the defined groups may then make up the universe of selected road segments to "unlock" for image data collection.

Advantageously, this sampling mechanism accounts for the fact that, over the course of a given window of time, the likelihood that image data will be passively captured for the various different road segments of the road network may vary widely depending on the usage pattern of the road segments. In this respect, while randomly sampling across the entire network of road segments may result in approximately the same number of low-usage and high-usage road segments being "unlocked" for image data collection, the collection of image data over the course of a given window of time would then be disproportionately skewed in favor of the high-usage road segments given the higher usage pattern. To address this, the sampling mechanism uses an approach that attempts to give each group of road segments relatively equal representation in terms of image captures that will be collected during a given window of time. For example, in the example described above where approximately 8,000 randomly-sampled road segments are selected from the lowest-usage group and approximately 100 randomly-sampled road segments are selected from the high-usage group, this may in turn result in collection of image data for approximately the same number of total road segments from each group during a given window of time (e.g., 20 segments per group) in view of the differences in usage patterns.

The sampling mechanism may take other forms as well.

At block 602, after the map evaluation pipeline 610 has selected the road segments within each defined group of road segments for which to request the collection of image data, map evaluation pipeline 610 may interact with image collection pipeline 412 (either directly or indirectly via road-network database 414 or the like) in order to cause image collection pipeline 412 to thereafter collect any image data for the selected road segments that is passively captured by one or more image-capture devices. In this respect, due to the passive nature of image collection pipeline 412, this may result in a random sampling within each category of selected roads, which in turn may result in the collection of image data for approximately the same total number of road segments in each category. The function of causing image collection pipeline 412 to thereafter collect passively-captured image data for the selected road segments may take various forms.

As one possible implementation, in order to cause image collection pipeline 412 to thereafter collect passively-captured image data for the selected road segments, map evaluation pipeline 610 may update the road-network data in road-network database 414 to reflect that new image data should be collected for each of the selected road segments. For instance, for each of the selected road segments, map evaluation pipeline 610 may update the road-network data to include an indication that affirmative collection of fresh image data has been requested (or may at least associate such an indication with the road-network data). In such an implementation, these indications may then be used by image collection pipeline 412 during application of the collection policy as described above with respect to block 403 of FIG. 4, which may result in image data being collected for at least some of the selected road segments within each defined group of road segments. For instance, if map evaluation pipeline 610 updated the road-network data in road-network database 414 to include an indication that a given road segment should be the subject of image collection, then if and when image collection pipeline 412 later detects that image data for the given road segment has been passively captured by one or more image-capture devices and accesses that road-network data to determine whether to collect that captured image data, image collection pipeline 412 may determine that the given road segment has been flagged for affirmative collection of fresh image data and thereby decide to collect the captured image data for the given road segment. In turn, image collection pipeline 412 may instruct the one or more image-capture devices to upload the captured image data for the given road segment.

As another possible implementation, in order to cause image collection pipeline 412 to thereafter collect passively-captured image data for the selected road segments that is passively captured, map evaluation pipeline 610 may send a communication directly to image collection pipeline 412 that requests collection of image data for the selected road segments to the extent that such image data is passively captured by image-captured devices. In this respect, the communication that is sent to map evaluation pipeline 412 may include an identification of the selected road segments for which collection of image data is being sought, among other possible information. Thereafter, if and when image collection pipeline 412 detects that image data for a given one of the selected road segments has been passively captured by one or more image-capture devices, image collection pipeline 412 may take the map evaluation pipeline's request into account when applying the collection policy for determining whether to collection such image data and thereby decide to collect the captured image data. In turn, image collection pipeline 412 may instruct the one or more image-capture devices to upload the captured image data for the given one of the selected road segments.

Map evaluation pipeline 610 may cause image collection pipeline 412 to thereafter collect passively-captured image data for the selected road segments in other manners as well. The image data for the selected road segments that is passively captured and then collected by image collection pipeline 412 over the course of some window of time (e.g., a week, a month, etc.)—which as noted above will typically only cover a subset of the total set of selected road segments given the passive nature of the image capture—may then be provided to map evaluation pipeline 610 as shown in FIG. 6.

In turn, at block 603, map evaluation pipeline 610 may utilize that collected image data as a basis for generating "map evaluation tasks" that each define a given activity for reviewing and evaluating the accuracy of previously-encoded map data for a selected road segment. Map evaluation pipeline 610 may generate these map evaluation tasks based on the image data collected by image collection pipeline 412 in various ways.

As one possibility, map evaluation pipeline 610 may be configured to generate a new map evaluation task based on each new image for a selected road segment that is collected by image collection pipeline 412. As another possibility, map evaluation pipeline 610 may be configured to group newly-collected images for the selected road segments together based on road segment (or the like) and then generate a new map evaluation task for each such group of newly-collected images, which may enable a curator to review and evaluate map accuracy for a selected road segment once using multiple images. Map evaluation pipeline 610 may generate the map evaluation based on the image data collected by image collection pipeline 412 in other ways as well.

Further, the map evaluation task may include any of various information that may be relevant to a curator when reviewing and evaluating previously-encoded map data for a selected road segment to determine its accuracy. As one possibility, a map evaluation task may include data indicating a particular portion of the map data should be reviewed and evaluated as part of the task. This data may take various forms, examples of which may include an indication of which particular location or area within the map is to be evaluated (e.g., a set of coordinates, an identifier of a given road segment, etc.) and/or a link or pointer to the particular portion of the map data should be reviewed and evaluated as part of the task, among others. As another possibility, a map evaluation task may include a copy of (or link to) at least one newly-collected image for a selected road segment that formed the basis for the map evaluation task. As yet another possibility, a map evaluation task may include other data about the newly-collected image(s) for a selected road segment that form the basis for the map evaluation task, one example of which may include data that provides information about the objects detected in the newly-collected image(s). A map evaluation task may include various other types of data as well.

After the map evaluation tasks are generated, map evaluation pipeline 610 may then use one or more queues (or the like) to maintain and order such map evaluation tasks for assignment to curators. As with the map update tasks discussed above, the map evaluation tasks in the one or more queues may be ordered using a simple FIFO mechanism or may optionally be ordered according to a prioritization scheme that intelligently prioritizes the map evaluation tasks based on any of various factors.

At block 604, map evaluation pipeline 610 may assign the generated map evaluation tasks to one or more curators for evaluation. As with the update tasks discussed above, map evaluation pipeline 610 may assign the map evaluation tasks in various ways.

Under one possible approach for assigning map evaluation tasks, map evaluation pipeline 610 may assign a set of one or more pending map evaluation tasks to a given curator in response to detecting that the given curator is available to take on newly-assigned map evaluation tasks (e.g., after the given curator has completed some or all of her previously-assigned map evaluation tasks). In accordance with this approach, when map evaluation pipeline 610 detects that the given curator is available to take on newly-assigned map evaluation tasks, map evaluation pipeline 610 may generally function to (i) select the particular queue(s) of map evaluation tasks from which to assign the one or more tasks to the given curator and then (ii) assign the given curator a next one or more map evaluation tasks from the selected queue(s) (e.g., the one or more map evaluation tasks that are at the "top" of the queue). In this respect, the function of selecting the particular queue(s) of map evaluation tasks from which to assign the one or more tasks to the given curator may take various forms.

As one possibility, if map evaluation pipeline 610 is only utilizing a single global queue to maintain all map evaluation tasks, then the function of selecting the particular queue(s) of map evaluation tasks from which to assign the one or more tasks to the given curator may simply comprise selecting that one global queue.

As another possibility, if map evaluation pipeline 610 is utilizing a plurality of different queues to maintain map evaluation tasks from different categories, then the function of selecting the particular queue(s) of map evaluation tasks from which to assign the one or more tasks to the given curator may involve a determination of which of these different category-specific queues should be used for the assignment to the given curator. Such a determination may be based on various factors. As one possible factor, the map evaluation pipeline's determination of which of these different category-specific queues should be used for the assignment to the given curator may be based on certain information about the given curator, such as an experience level of the given curator and/or a recognized set of skills and/or specializations of the given curator, among other possibilities. For example, if the map evaluation tasks are maintained in different queues that are keyed to different categories of potential map evaluations (e.g., a first queue for map update tasks related to missing roads, a second queue for map update tasks related to lane counts, a third queue for map update tasks related to turn restrictions, etc.) and the given curator has a recognized set of skills and/or specializations that matches up with a particular one of these different categories, then map evaluation pipeline 610 may then select the queue keyed to that one category as the queue from which to assign the one or more tasks to the given curator.

To facilitate this functionality, each available curator may have an associated profile that contains information about the curator, which may take various forms and include information such as (i) an identification of the curator, (ii) the curator's availability to complete map evaluation tasks, (iii) the curator's experience level, and/or (iv) a recognized set of skills and/or specializations of the curator if any exist (e.g., particular map evaluation tasks the curator is more efficient at completing). A curator's profile may take other forms as well.

The map evaluation pipeline's determination of which of the different category-specific queues should be used for the assignment to the given curator may be based on various other factors as well.

The function of selecting the particular queue(s) of map evaluation tasks from which to assign the one or more tasks to the given curator may take other forms as well.

As noted above, after selecting the particular queue(s) of map evaluation tasks from which to assign the one or more tasks to the given curator, map evaluation pipeline 610 may then assign a next one or more map evaluation tasks from the selected queue(s) (e.g., the one or more map evaluation tasks that are at the "top" of the queue) to the given curator. For example, if map evaluation pipeline 610 is configured to assign the given curator 10 new map evaluation tasks during each assignment, map evaluation pipeline 610 may assign the next 10 map evaluation tasks from the selected queue to the given curator. Of course, this example assignment of 10 map evaluation tasks has merely been described for purposes of illustration, and it should be understood that map evaluation pipeline 610 may assign any number of map evaluation tasks to the given curator during any given assignment operation. Further, it should be understood that map evaluation pipeline 610 could assign map evaluation tasks from multiple different queues to the given curator (e.g., in a scenario where the first-selected queue only contains a smaller number of map evaluation tasks and map evaluation pipeline 610 is configured to assign more than that number of map evaluation tasks to the given curator).

Under another possible approach for assigning map evaluation tasks, map evaluation pipeline 610 may assign pending map evaluation tasks to curators in accordance with some trigger other than curator availability. Such a trigger may take various forms, examples of which may include (i) a determination that a threshold number of map evaluation tasks are currently pending and are ready to be assigned or (ii) a determination that a threshold amount of time has passed since the last assignment of map evaluation tasks to curators, among others. In accordance with this approach, when map evaluation pipeline 610 detects such a trigger, map evaluation pipeline 610 may identify which one or more curators are to receive a new assignment of map evaluation tasks (and perhaps also determine the number of map evaluation tasks to be assigned to each such curator), and then for each respective curator that is identified, may function to (i) select the particular queue(s) of map evaluation tasks from which to assign one or more tasks to the respective curator (e.g., in a manner similar to that described above) and then (ii) assign the respective curator a next one or more one or more map evaluation tasks from the selected queue(s). Map evaluation pipeline 610 may assign map evaluation tasks based on such a trigger in other manners as well.

Under another possible approach for assigning map evaluation tasks, map evaluation pipeline 610 may assign pending map evaluation tasks to curators in accordance with a schedule (e.g., a schedule defining one or more particular times each day when an assignment operation is to be carried out). In accordance with this approach, each time that a scheduled assignment operation is to be carried out, map evaluation pipeline 610 may identify which one or more curators are to receive a new assignment of map evaluation tasks during that assignment operation (and perhaps also determine the number of map evaluation tasks to be assigned to each such curator), and then for each respective curator that is identified, may function to (i) select the particular queue(s) of map evaluation tasks from which to assign one or more tasks to the respective curator (e.g., in a manner similar to that described above) and then (ii) assign the respective curator a next one or more map evaluation tasks from the selected queue(s). Map evaluation pipeline 610 may assign map evaluation tasks based on such a schedule in other manners as well At block 605, after map evaluation pipeline 610 assigns a new set of one or more map evaluation tasks to a curator, map evaluation pipeline 610 may interact with the curator (e.g., via the curator's client station) in order to obtain the curator's feedback regarding the assigned set of one or more map evaluation tasks. Map evaluation pipeline 610 may interact with the one or more curators in various ways. In practice, this interaction may involve communication between the back-end platform and a client station associated with the curator, such as client station 612 shown in FIG. 6.

Client station 612 may generally comprise any computing device that is configured to facilitate interaction between the curator and the map evaluation pipeline 610 of the back-end platform. For instance, client station 612 may take the form of a smartphone, a tablet, a desktop computer, a laptop, a netbook, and/or a PDA, among other possibilities. Further, in at least some embodiments, client station 612 may comprise an I/O interface, a communication interface, at least one processor, data storage, and executable program instructions for facilitating interaction between the curator and map evaluation pipeline 610 (which may be embodied in the form of a software application, such as a mobile application, web application, or the like).

The interaction that may take place between client station 612 and map evaluation pipeline 610 may take any of various forms, representative examples of which may include (i) the back-end platform sending a communication to client station 612 to notify the curator that the assigned set of one or more map evaluation task is ready for review and completion, (ii) back-end platform transmitting the assigned set of one or more map evaluation tasks to client station 612, (iii) the back-end platform causing client station 612 to display an interface for the curator to review and complete the assigned set of one or more map evaluation tasks, and (iv) client station 612 receiving user input from the curator related to the assigned set of one or more map evaluation tasks and then transmitting data defining that user input to the back-end platform, among other possibilities.

The interface that is presented to the curator for reviewing and completing the assigned set of one or more map evaluation tasks may take any of various forms. As one possibility, such an interface may comprise the previously-encoded map data for a selected road segment that is the subject of the map evaluation task (which may be presented in the form of graphics and/or text) along with the one or more newly-collected images for the selected road segment and perhaps also some associated information about the one or more newly-collected images for the selected road segment (e.g., detected objects information). However, the interface that is presented to the curator for the map evaluation tasks may take various other forms as well.

Further, the feedback that client station 612 may receive from the curator via such an interface may take various forms. As one possibility, the feedback for each map evaluation task may include a binary indication of accuracy of the previously-encoded map data for a selected road segment that is the subject map evaluation task. In this respect, if the curator determines that there is any inaccuracy in the previously-encoded map data for the road segment, the curator may provide feedback indicating the previously-encoded map data was inaccurate.

As another possibility, the feedback may include an indication of which aspect(s) of the previously-encoded map data for the selected road segment are not accurate. For instance, the feedback could include an indication of each category of road element inaccuracy that appears to be present in the previously-encoded map data for the selected road segment (e.g., incorrect speed limit, incorrect number of lanes, an incorrect name of the road, etc.).

The feedback that client station 612 may receive from the curator via such an interface may take various other forms as well.

At block 606, map evaluation pipeline 610 may derive one or more map accuracy metrics based on the received feedback for the map evaluation tasks. In this respect, map evaluation pipeline 610 may compile the received feedback for some set of map evaluation tasks and then derive one or more map accuracy metrics based on the compiled feedback in various ways.

In one implementation, map evaluation pipeline 610 may derive a road segment-level accuracy metric based on the received feedback for the set of map evaluation tasks. In this respect, map evaluation pipeline 610 may evaluate the received feedback to determine an extent of evaluated road segments that were deemed to be inaccurate, and may then represent this determined extent in terms of a road segment-level accuracy metric. For instance, if feedback was received for 100 road segments over the course of a given set of map evaluation tasks and 30 of the road segments were deemed to be inaccurate, then map evaluation pipeline 610 may determine a road segment-level accuracy metric of 70%.

Further, a road segment-level accuracy metric such as this may be derived in various ways. As one possibility, the road segment-level accuracy metric may be derived across all of the road segments that are the subject of map evaluation tasks in the set under evaluation. As another possibility, map evaluation pipeline 610 may first break such road segments up by sample group, may derive a respective road segment-level accuracy metric for each sample group, and may then aggregated the respective road segment-level accuracy metric for each sample group into a single road segment-level accuracy (e.g., by taking the mean of such metrics).

In another implementation, map evaluation pipeline 610 may derive a respective road-element-level accuracy metric for each of one or more road elements of interest. In this respect, as noted above, a curator's feedback may include an indication of which road element(s) appear to be inaccurate within the previously-encoded map data for each road segment that is evaluated. For example, if a curator reviews a map evaluation task for a road segment and determines that the previously-encoded map data for the selected road segment accurately reflects the road name, the lane count, and the presence of a one-way street, but that the previously-encoded map data for the road segment incorrectly reflects the presence of a turn restriction, the curator may submit an indication that there is an inaccuracy with respect to a turn restriction for the road segment.

Based on these received indications of which road element(s) appear to be inaccurate within the previously map data fort road segment that is the subject of map evaluation tasks in the set under evaluation, map evaluation pipeline 610 may derive a road-element-level accuracy metric for each of various different road elements across the road segments. For instance, if map evaluation pipeline 610 receives an indication of an incorrect road name for 40 road segments out of 540 total road segments that were the subject of the map evaluation tasks being evaluated, map evaluation pipeline 610 may derive a road-element-level accuracy metric for road names that indicates a 92.59% accuracy for that particular road element within the map data.

Map evaluation pipeline 610 may derive accuracy metrics based on the compiled indications in other ways as well.

Figure 7:
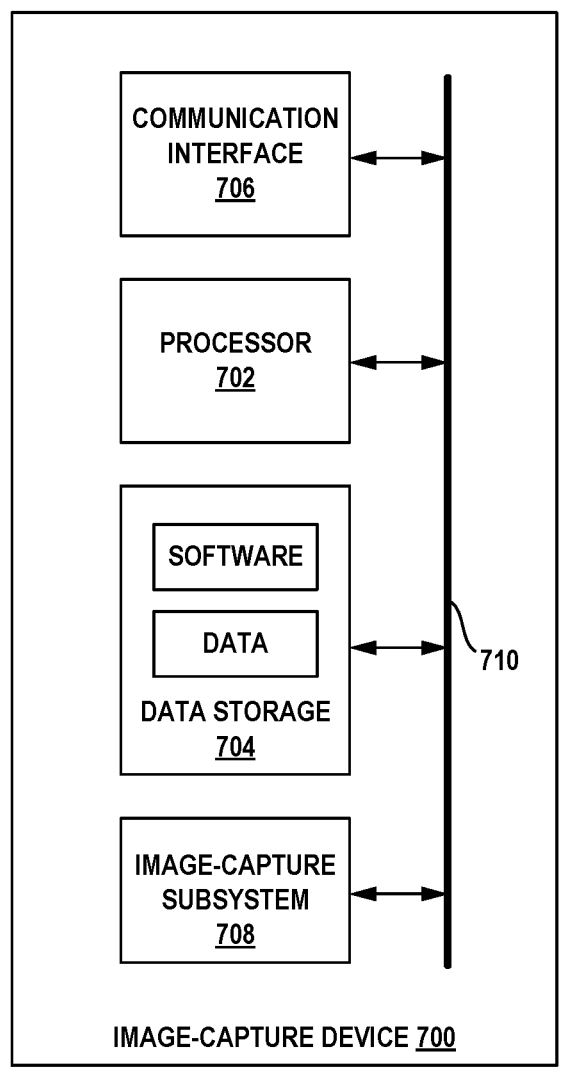
FIG. 7 is a simplified block diagram that illustrates some structural components that may be included in an example image-capture device.

Turning now to FIG. 7, a simplified block diagram is provided to illustrate some structural components that may be included in an example image-capture device 700, which may be configured to carry out any of the various functions disclosed herein. At a high level, image-capture device 700 may include a processor 702, data storage 704, a communication interface 706, and an image-capture subsystem 708, all of which may be communicatively linked by a communication link 710 that may that various forms, one example of which is a system bus.

Processor 702 of image-capture device 700 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Data storage 704 of image-capture device 700 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of image-capture device 700 such that image-capture device 700 is configured to perform various functions related to the capture and upload of image data (among other possible functions), and (ii) captured image data until such time image-capture device 700 uploads the captured image data to image collection pipeline 412 or deletes the captured image data.

Image capture subsystem 708 of image-capture device 700 may comprise one or more hardware or software components that facilitate the capture of image data while traversing a road network. In this respect, the image capture subsystem of image-capture device 312 may include one or more sensors (e.g., camera sensors) that are configured to capture image data at a particular rate (e.g., four frames per second).

Communication interface 710 of image-capture device 700 may take the form of any one or more interfaces that facilitate communication with image collection pipeline 412 and/or other remote computing systems (e.g., a transportation-matching system), among other possibilities. In this respect, each such interface may be wired and/or wireless and may communicate according to any of various communication protocols, examples of which may include radio access network (e.g., cellular network), Wi-Fi, and/or wide area network (e.g., Internet).

Figure 8:
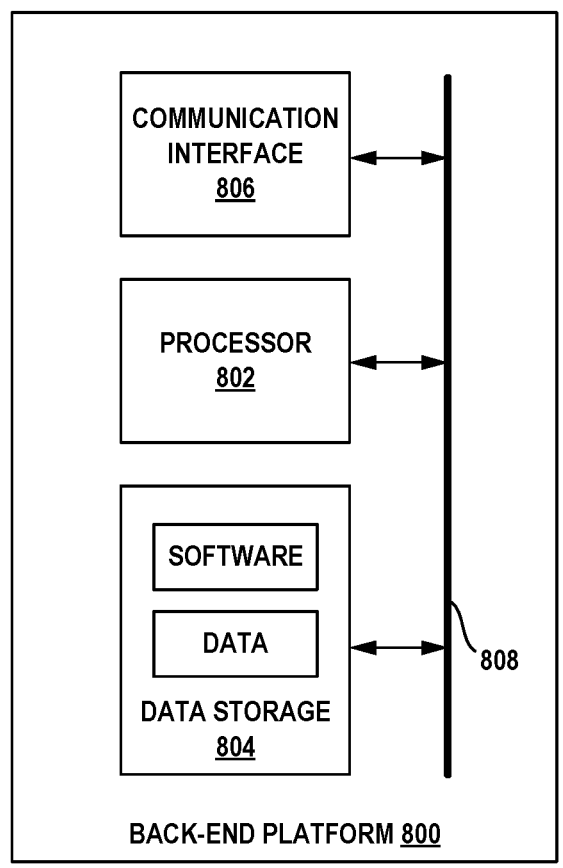
FIG. 8 is a simplified block diagram that illustrates some structural components that may be included in an example back-end platform.

Turning now to FIG. 8, a simplified block diagram is provided to illustrate some structural components that may be included in an example back-end platform 800, which may be configured to carry out any of the various functions disclosed herein. At a high level, computing platform 800 may generally comprise any one or more computing systems (e.g., an on-board vehicle computing system and/or one or more off-board servers) that collectively include at least a processor 802, data storage 804, and a communication interface 806, all of which may be communicatively linked by a communication link 808 that may take the form of a system bus, a communication network such as a public, private, or hybrid cloud, or some other connection mechanism. Each of these components may take various forms.

The one or more computing systems of back-end platform 800 may take various forms and be arranged in various manners. For instance, as one possibility, back-end platform 800 may comprise one or more dedicated servers that have been installed with back-end software for communicating with image-capture devices (e.g., image-capture device 312 described above with respect to FIG. 3) and processing received metadata and location data from the image-capture devices. As another possibility, back-end platform 800 may comprise computing infrastructure of a public, private, and/or hybrid cloud (e.g., computing and/or storage clusters) that has been installed with the back-end software. In this respect, the image-data collector that operates back-end platform 800 may either supply its own cloud infrastructure or may obtain cloud infrastructure from a third-party provider of "on demand" computing resources, such as Amazon Web Services (AWS) or the like. Other implementations of back-end platform 800 are possible as well.

Processor 802 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 802 could comprise processing components that are distributed across a plurality of physical computing devices connected via a network, such as a computing cluster of a public, private, or hybrid cloud.

In turn, data storage 804 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 804 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 8, data storage 804 may be capable of storing both (i) program instructions that are executable by processor 802 such that computing platform 800 is configured to perform any of the various functions disclosed herein (including but not limited to any the functions described with reference to FIGS. 4-6), and (ii) data that may be received, derived, or otherwise stored by computing platform 800.

Communication interface 806 may take the form of any one or more interfaces that facilitate communication between computing platform 800 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 800 may additionally include one or more input/output (I/O) interfaces that are configured to either (i) receive and/or capture information at computing platform 800 and (ii) output information from computing platform 800 (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 800 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
receiving, at a computing platform from an image-capture device via a network-based communication path, image-capture metadata that provides information about a set of images that were passively captured by the image-capture device;
based at least on the received image-capture metadata, applying, at the computing platform, a collection policy for determining whether to collect any of the set of images that were passively captured by the image-capture device and thereby determining that a selected subset of one or more images in the set of images are to be collected from the image-capture device;
instructing, by the computing platform via the network-based communication path, the image-capture device to upload the selected subset of one or more images; and
after instructing the image-capture device to upload the selected subset of one or more images, receiving, at the computing platform from the image-capture device via the network-based communication path, the selected subset of one or more images from the image-capture device.

2. The computer-implemented method of claim 1, further comprising:
prior to applying the collection policy:
receiving, at the computing platform from the image-capture device via the network-based communication path, location data that is indicative of a time sequence of locations of the image-capture device during a period of time when the set of images were passively captured by the image-capture device; and
based on the received location data, determining, at the computing platform, a set of capture locations associated with the set of images, wherein the determined set of capture locations is used by the computing platform as a further basis for applying the collection policy.

3. The computer-implemented method of claim 2, wherein determining the set of capture locations associated with the set of images comprises:
based on the received location data, determining a time sequence of device locations for the image-capture device during the period of time when the set of images were passively captured by the image-capture device; and
using the determined time sequence of device locations and the image-capture metadata to determine the set of capture locations associated with the set of images.

4. The computer-implemented method of claim 1, wherein each image in the set of images corresponds to a road segment in a road network, and wherein applying the collection policy comprises:
determining whether each respective image in the set of images is to be collected from the image-capture device based on an evaluation of at least one factor selected from a group of factors consisting of:
(i) whether there is an absence of previously-collected images for the respective image's corresponding road segment;
(ii) whether previously-collected images for the respective image's corresponding road segment lack a threshold level of freshness;
(iii) whether there is a difference between objects detected in the respective image and objects detected in previously-collected images for the respective image's corresponding road segment;
(iv) whether a request to affirmatively collect fresh image data for the respective image's corresponding road segment has been received; and
(v) whether the respective image's corresponding road segment has a threshold level of importance.

5. The computer-implemented method of claim 4, wherein determining whether each respective image in the set of images is to be collected from the image-capture device based on the evaluation of the at least one factor comprises, for each respective image in the set of images:
accessing stored information about the previously-collected images for the respective image's corresponding road segment.

6. The computer-implemented method of claim 4, wherein determining whether each respective image in the set of images is to be collected from the image-capture device based on the evaluation of the at least one factor comprises, for each respective image in the set of images:
for the at least one factor, determining a factor-specific value for the respective image;
based on the determined factor-specific value, determining a composite value for the respective image; and determining whether the respective image is to be collected from the image-capture device based on a comparison between the respective image's composite value and a threshold value.

7. The computer-implemented method of claim 6, wherein the threshold value is dynamically updated based on upload activity of the image-capture device.

8. The computer-implemented method of claim 1, further comprising:
  utilizing the selected subset of one or more images to facilitate a process for reviewing and updating a map.

9. The computer-implemented method of claim 1, further comprising:
  utilizing the selected subset of one or more images to facilitate a process for reviewing and evaluating accuracy of a map.

10. The computer-implemented method of claim 1, wherein the collection policy comprises a multi-factor collection policy, and wherein applying the multi-factor collection policy comprises:
  evaluating a group of two or more factors that is based at least in part on the received image-capture metadata.

11. A non-transitory computer-readable medium comprising program instructions stored thereon that are executable to cause a computing platform to perform functions comprising:
  receiving, at the computing platform from an image-capture device via a network-based communication path, image-capture metadata that provides information about a set of images that were passively captured by the image-capture device;
  based at least on the received image-capture metadata, applying, at the computing platform, a collection policy for determining whether to collect any of the set of images that were passively captured by the image-capture device and thereby determining that a selected subset of one or more images in the set of images are to be collected from the image-capture device;
  instructing, by the computing platform via the network-based communication path, the image-capture device to upload the selected subset of one or more images; and
  after instructing the image-capture device to upload the selected subset of one or more images, receiving, at the computing platform from the image-capture device via the network-based communication path, the selected subset of one or more images from the image-capture device.

12. The computer-readable medium of claim 11, wherein the computer-readable medium further comprises program instructions stored thereon that are executable to cause the computing platform to perform functions comprising:
  prior to applying the collection policy:
    receiving, at the computing platform from the image-capture device via the network-based communication path, location data that is indicative of a time sequence of locations of the image-capture device during a period of time when the set of images were passively captured by the image-capture device; and
    based on the received location data, determining, at the computing platform, a set of capture locations associated with the set of images, wherein the determined set of capture locations is used by the computing platform as a further basis for applying the collection policy.

13. The computer-readable medium of claim 12, wherein determining the set of capture locations associated with the set of images comprises:

based on the received location data, determining a time sequence of device locations for the image-capture device during the period of time when the set of images were passively captured by the image-capture device; and
using the determined time sequence of device locations and the image-capture metadata to determine the set of capture locations associated with the set of images.

14. The computer-readable medium of claim 11, wherein each image in the set of images corresponds to a road segment in a road network, and wherein applying the collection policy comprises:
  determining whether each respective image in the set of images is to be collected from the image-capture device based on an evaluation of at least one factor selected from a group of factors consisting of:
    (i) whether there is an absence of previously-collected images for the respective image's corresponding road segment;
    (ii) whether previously-collected images for the respective image's corresponding road segment lack a threshold level of freshness;
    (iii) whether there is a difference between objects detected in the respective image and objects detected in previously-collected images for the respective image's corresponding road segment;
    (iv) whether a request to affirmatively collect fresh image data for the respective image's corresponding road segment has been received; and
    (v) whether the respective image's corresponding road segment has a threshold level of importance.

15. The computer-readable medium of claim 14, wherein determining whether each respective image in the set of images is to be collected from the image-capture device based on the evaluation of the at least one factor comprises, for each respective image in the set of images:
  accessing stored information about the previously-collected images for the respective image's corresponding road segment.

16. The computer-readable medium of claim 14, wherein determining whether each respective image in the set of images is to be collected from the image-capture device based on the evaluation of the at least one factor comprises, for each respective image in the set of images:
  for the at least one factor, determining a factor-specific value for the respective image;
  based on the determined factor-specific value, determining a composite value for the respective image;
  determining whether the respective image is to be collected from the image-capture device based on a comparison between the respective image's composite value and a threshold value.

17. The computer-readable medium of claim 16, wherein the threshold value is dynamically updated based on upload activity of the image-capture device.

18. The computer-readable medium of claim 11, wherein the computer-readable medium further comprises program instructions stored thereon that are executable to cause the computing system to perform functions comprising:
  utilizing the selected subset of one or more images to facilitate a process for reviewing and updating a map.

19. The computer-readable medium of claim 11, wherein the collection policy comprises a multi-factor collection policy, and wherein applying the multi-factor collection policy comprises:
  evaluating a group of two or more factors that is based at least in part on the received image-capture metadata.

20. A computing platform comprising:

at least one processor;

a non-transitory computer-readable medium; and program instructions stored on the non-transitory computer-readable medium that are executable by the at least one processor to cause the computing platform to perform functions comprising:

receiving, at the computing platform from an image-capture device via a network-based communication path, image-capture metadata that provides information about a set of images that were passively captured by the image-capture device;

based at least on the received image-capture metadata, applying, at the computing platform, a collection policy for determining whether to collect any of the set of images that were passively captured by the image-capture device and thereby determining that a selected subset of one or more images in the set of images are to be collected from the image-capture device;

instructing, by the computing platform via the network-based communication path, the image-capture device to upload the selected subset of one or more images; and after instructing the image-capture device to upload the selected subset of one or more images, receiving, at the computing platform from the image-capture device via the network-based communication path, the selected subset of one or more images from the image-capture device.

21. The computing platform of claim 20, wherein the collection policy comprises a multi-factor collection policy, and wherein applying the multi-factor collection policy comprises:

evaluating a group of two or more factors that is based at least in part on the received image-capture metadata.

* * * * *